(12) United States Patent
Kim

(10) Patent No.: US 11,150,783 B1
(45) Date of Patent: Oct. 19, 2021

(54) GUI BASED METHODS AND SYSTEMS FOR WORKING WITH LARGE NUMBERS OF INTERACTIVE ITEMS

(71) Applicant: Jason Kim, Milpitas, CA (US)

(72) Inventor: Jason Kim, Milpitas, CA (US)

( * ) Notice: Subject to any disclaimer, the term of this patent is extended or adjusted under 35 U.S.C. 154(b) by 0 days.

(21) Appl. No.: 16/940,197

(22) Filed: Jul. 27, 2020

Related U.S. Application Data

(60) Provisional application No. 62/879,761, filed on Jul. 29, 2019.

(51) Int. Cl.
| | |
|---|---|
| *G06F 3/048* | (2013.01) |
| *G06F 3/0482* | (2013.01) |
| *G06F 9/451* | (2018.01) |
| *G06F 3/01* | (2006.01) |
| *G06F 3/16* | (2006.01) |
| *G06F 3/0488* | (2013.01) |

(52) U.S. Cl.
CPC ............ *G06F 3/0482* (2013.01); *G06F 3/017* (2013.01); *G06F 3/04883* (2013.01); *G06F 3/167* (2013.01); *G06F 9/451* (2018.02)

(58) Field of Classification Search
CPC ............................... G06F 3/0482; G06F 9/451
See application file for complete search history.

(56) References Cited

U.S. PATENT DOCUMENTS

| | | | |
|---|---|---|---|
| 7,552,395 B2 | 6/2009 | Neale et al. | |
| 7,769,741 B2 | 8/2010 | Borovoy et al. | |
| 2006/0036568 A1* | 2/2006 | Moore | G06F 16/168 |
| 2008/0091669 A1* | 4/2008 | Anderson | G06F 16/211 |
| 2009/0319895 A1* | 12/2009 | Kinsella | G06Q 30/02 |
| | | | 715/706 |

\* cited by examiner

*Primary Examiner* — Claudia Dragoescu
(74) *Attorney, Agent, or Firm* — Patricia Brzostowicz; Superior Patent Group, LLC

(57) ABSTRACT

A GUI and processor-based method for managing selectable entities such as files and directories. When the number of selectable entities in the GUI is large (e.g. over 50 entities) or if similar operations must be done repeatedly, the user experience can be drastically improved by generating and operating on sets of selectable entities. Users (such as a human user) start by picking a plurality of entities displayed on the GUI and save them in memory as a named selection set. Users operate the GUI to manipulate any such selection sets via various means (such as intersection, union, inversion/negation, or via user defined programs) until a selection set contains only the entities that the user wishes to operate on. The user then directs the GUI to automatically perform any of memory/storage operations and/or network transmission operations upon any files and directories in the selection set as desired.

20 Claims, 24 Drawing Sheets

Inventory / Misc Crafting

Ores

3 Selected

| Name | Count | Cost | Type |
|---|---|---|---|
| Unknown Blue Ore, Glowing | 13 | 112 | Ore |
| Unknown Red Ore, Glowing | 7 | 125 | Ore |
| Iron Ore | 44 | 35 | Ore |
| Copper Ore | 13 | 7 | Ore |
| Gold Ore | 6 | 33 | Ore |
| Silver Ore | 22 | 26 | Ore |
| Tin Ore | 4 | 6 | Ore |

Add Items
Remove Items
Create New Item Set
Delete Item Set

Figure 22

Welcome, Adventurer! Browse Our Fine Wares!

0 Selected

| Name | Count | Cost | Type |
|---|---|---|---|
| Fine Long Sword | 5 | 1000 | Sword |
| Enchanted Long Sword, Lvl 1 | 3 | 5000 | Sword |
| Enchanted Long sword, Lvl 2 | 3 | 10000 | Sword |
| Enchanted Long Sword, Lvl 3 | 1 | 40000 | Sword |
| Short Sword, Common | 8 | 262 | Sword |
| Fine Short Sword | 2 | 750 | Sword |
| Enchanted Short Sword, Lvl 1 | 1 | 3250 | Sword |

Sell "Cheap Ores", "Junk" for 1932?

Sell    Cancel

Sell Item Set

| Item Sets | # |
|---|---|
| Cheap Ores | 3 |
| Expensive Ores | 0 |
| Junk | 13 |

"Cheap Ores", "Junk"
16 Items
Total Value: 1932

| Item | C | # |
|---|---|---|
| Copper Ore | 7 | 12 |
| Tin Ore | 8 | 11 |
| Lead Ore | 3 | 0 |
| Broken Broom | 1 | 2 |
| Rusted Blade | 2 | 6 |
| Wooden Spoon | 2 | 4 |
| Brass Candleholder | 4 | 1 |

GUI BASED METHODS AND SYSTEMS FOR WORKING WITH LARGE NUMBERS OF INTERACTIVE ITEMS

CROSS REFERENCE TO RELATED APPLICATIONS

This application claims the priority benefit of U.S. provisional patent application 62/879,761, filed Jul. 29, 2019, the entire contents of which are incorporated herein by reference.

BACKGROUND OF THE INVENTION

Field of the Invention

Description of the Related Art

GUI interfaces for computers have been in common use since the mid-1980s. One of the most fundamental (and earliest) of these GUIs shows the layout and location of files in the computer's local storage in graphical form, using the adopted nomenclature "window" and "icons" where each icon can represent a single file or directory. Using a pointing device, the user selects the files to operate on (e.g., creates a selection set) by "clicking" on the icon. Once selected, the user then initiates the desired operation on the selected entity (in this case, a file or directory) such as copying or moving the selected files, or deleting them, or other operations.

Typically, the user manually selects multiple items (or entities) by clicking on them in sequence. Other common selection methods include "shift-click" methods, where a contiguous sequence of entities can be selected (or unselected) by clicking on the first entity, then clicking on the last item in the sequence, typically with another modifier (typically the "Shift" key). Individual entities can also be added or removed from the selections by "control-click", where another modifier is held active while individual entities are clicked, thus adding and removing them from the selection set.

Boolean selection methods: Boolean selection methods are also known in prior art. For example, Borovoy, U.S. Pat. No. 7,769,741 teaches a portable browsing interface for information retrieval. Neale, U.S. Pat. No. 7,552,395 teaches a graphical user interface for building Boolean queries and viewing search results. Such methods are commonly available as an "advanced" option on many databases, including the USPTO patent search database.

BRIEF SUMMARY OF THE INVENTION

The invention is based, in part, on the insight that although prior art GUI selection methods work well when operating with at most a few dozen entities at a time. However, these prior art methods can become increasingly inadequate when the GUI is dealing with a large number of selectable entities (e.g. hundreds, thousands or more selectable entities). These prior art methods also become inadequate if similar tasks must be repeated across multiple entities. Similarly, although prior art Boolean search methods can operate with larger numbers of selectable entities, such methods tend to be difficult to use. The invention is based, in part, on the insight that it is not realistic, in an easy to use system, to expect the user to be able to manually add and remove, in an error-free manner, a few elements from a set comprising hundreds or thousands of different elements. This is because prior art GUI tend to operate in a way where a single errant click can reset the entire selection set. Such prior art GUI methods can be both frustrating to users, and can also be inefficient in terms of time and effort, particularly if the user must then repeat similar type selection-and-operate cycles, with slightly varying parameters, when the content of a folder directory changes, or when the user is operating in different directories.

The invention is also based, in part, on the insight that in order to better deal with the above issues (e.g., using prior art GUI methods to operate on a large number of items), improved GUI methods and systems are needed that add additional functions to the GUI.

The invention disclosed herein can be any of a method, system, or a non-transitory computer storage medium for computer code for a processor to implement the method and system versions of the invention. However, for simplicity, often the method embodiments of the invention will be provided as specific examples.

In some embodiments, the invention may be a graphical user interface (GUI) based method for managing selectable entities. This GUI method will typically comprise designating, using a GUI and a computer processor, from a plurality of selectable entities, a selection set comprising entities from plurality of selectable entities, and saving this selection set in computer memory as a first selection set. The method will also comprise designating, using this GUI and a computer processor, from this plurality of selectable entities, at least one different selection set comprising different entities from the plurality of selectable entities, and saving each at least one different selection set in computer memory as at least one different selection set. The method will also comprise selecting, using the GUI and a computer processor, at least one set operation to be performed on the first selection set and on the at least one different selection set.

The method will then use the computer processor, this at least one set operation, the first selection set, and the at least one different selection set, and produce at least one new selection set. The method can also use this least one new selection set to manage at least some of the various selectable entities.

Note that although the advantages of the invention become most apparent when working with a large number (hundreds or thousands or more) of selectable entities, it is not a requirement that a large number of entities exist for users to benefit from this invention. As will be shown below, the benefits of this invention can be demonstrated even when dealing with a much smaller (e.g. less than 100) number of entities as well.

BRIEF DESCRIPTION OF THE DRAWINGS

FIG. 12 shows the website youtube.com, as rendered by the present invention browser.

FIG. 14 shows the result of the search in FIG. 13.

FIG. 17 shows a video game example, here a video game inventory screen, "Searching for Ores" is shown

FIG. 22 shows the result of revisiting the first shop, and selling "Cheap Ores" and "Junk".

DETAILED DESCRIPTION OF THE INVENTION

Figure 1:
FIG. 1 shows a GUI screenshot where the user has manually selected a single file.

In addition to the discussion, additional description will also be made through referencing the various figures.

Definitions

1. GUI—Graphical User Interface.
2. Selectable Entity—The invention's improved GUI operates on "entities". Here the term "entity" is a description of, or a link to, or can denote, essentially any type of defined object. The object in turn can be a "lump" or "set" of digital data. The invention can be implemented using many kinds of GUIs, and the invention can operate on almost any kind of entities and associated objects. For example, a word processor type GUI operates on text entities, a spreadsheet type GUI operates on cells, rows, and column type entities, and a file browser type GUI operates on files and directory entities.

Typically, the entity that the GUI manipulates can also be "selected" by the user, either one entity at a time or multiple entities at a time, for additional manipulation and/or operation. For example, in a file browser, the underlying files and/or directories can be selected, by way of their linked entities, so that the user can copy, rename, move, or delete, one or more files/directories at the same time. For the purposes of this invention, we concern ourselves with the entities that are selectable by the user, irrespective of the GUI.

The exact method, system, and means for user entity selection is generally irrelevant to this invention. In this disclosure, the act of selecting an entity is occasionally designated as a "click" because a button click via a mouse or similar pointing device is one of the most common methodologies in use with computers for the user to select the entity, and its associated object, for one or more subsequent operations. However, this invention does not require that an actual clicking event occur. The main point is that something or someone has somehow caused the GUI to select one or more entities, and their associated objects, for subsequent operations.

Thus, for example, in some embodiments, the GUI may be configured to receive the user input by any of a touch interface, pointing device, gesture recognition device, or voice recognition device. These examples of specific devices, methods and systems are not meant to be exhaustive. For example. enhanced accessibility user interfaces used by individuals with disabilities or functional limitations, such as eye motion, tongue motion, breath activation, ECG sensing, nerve signal measurements, or even magnetic resonance imaging of the brain, can also be used to accept input by the user.

Here at least some of these entities are displayed by the computer processor on the GUI, and are selected (e.g. by using any of a touch interface and pointing device, gesture recognition device, voice recognition device, or other method) to designate at least some of the entities displayed by the computer processor on the GUI.

2a. Activating—this disclosure also occasionally uses the term "activate" to mean that something or someone has caused an entity (or a set of entities) to become selected (or "clicked", as per above in Definition 2). Note, however, that since "activation" is implied any time a user directs a computer to perform an operation, the term "activation" is generally not intended as a limitation unless otherwise so specified.

3. Objects—the underlying data structure referred to by an entity. All entities are generally linked to an associated object, but not all objects may have a discoverable entity. For example, within a file browser GUI, entities typically refer to underlying objects such as files and directories. Note, however, that for a given GUI, some objects may be "hidden", and thus may not have a visible or observable or discoverable linked entity.

This invention is primarily concerned with selectable entities, and generally ignores or is silent with respect to hidden or invisible objects. The actual object that the entity refers to becomes important when the user carries out an operation on the selected entities (see definition 4 below). Generally, this disclosure only distinguishes between the entity and its associated object when working with selections or selection sets. For our purposes, a selectable entity refers to those entity linked object or objects that are managed by the GUI.

Put alternatively, the entities provide the mapping or linkage between the GUI representation of the objects to the actual objects that the GUI operates on. Thus, when one or more entities are somehow selected (e.g. via a "click") or activated through some other means, the GUI then has the links to the set of actual objects that the GUI can operate on. In other words, the entities describe or link to objects. In essence, objects are the embodiment of entities.

4. Operation—A GUI typically provides various features and capabilities to operate on objects. Each GUI has different capabilities. For example, a file browser might offer the capability to copy, rename, move, delete files and directories. When such a capability of the GUI is used, this disclosure so describes it as "GUI operates on the selected entities." Thus, this disclosure often uses the term entities to refer to their associated objects.

5. Selection Set—simply, a set of selectable entities that have been "clicked on" or otherwise activated somehow. Most GUIs visually distinguish between unselected entities and the selected ones. The actual graphical or other type selection cues are not important for this invention, nor is the method, systems or devices used for the selection process.

6. User—generally understood to be a human being operating a Graphical User Interface (GUI). However, for the purpose of this Invention and the claims herein, all that is required is that a user is operating a GUI.

Although in some embodiments, the personhood or humanness of the user is not a limitation, in other embodiments, including some preferred embodiments, a human user is required.

7. Computer processor: Modern computers and computerized devices typically comprise at least one processor, often an x86, MIPS, Arm, or another type processor, that often may contain more than one processor core. Often such computerized devices may contain specialized co-processors, such as graphics co-processors, and other processor devices. Here, for simplicity, the term "computer processor" will be used to denote any and all of these combinations. Thus, in the alternative, the term "computer processor" can be understood as being equivalent to "at least one computer processor."

As previously discussed, in some embodiments, the invention may be a graphical user interface (GUI) based method for managing selectable entities. This method can comprise using a GUI (often by human user input on the GUI) and a computer processor to designate, from a plurality of selectable entities, a first selection set comprising various entities from a plurality of selectable entities, and save this selection set in computer memory as a first selection set.

Further, according to the invention, the method will often also use this GUI (and often the same human's input into this GUI) and usually the same computer processor, and this plurality of selectable entities to designate at least one different selection set comprising different entities from this plurality of selectable entities. This at least one different selection set will typically be saved in computer memory as at least one different selection set.

Further, according to the invention, the method will also use this GUI (again often by the same human user providing input to this GUI), and usually the same computer processor, to select at least one set operation to be performed on the first selection set and the at least one different selection set.

Based on this input, the invention will then typically automatically create, using this computer processor, the at least one set operation, the first selection set, and the at least one different selection set, at least one new selection set. The invention can then either automatically, or as designated by the user using the GUI, use this at least one new selection set to manage at least some of the selectable entities.

Put alternatively, the invention may be a computerized method, system or even a non-transitory computer-readable medium for improving GUI usability. The invention operates by performing one or more of the following eight operations: These eight operations or functions, which may be implemented according to various combinations and permutations, may thus be viewed as comprising important components of the present invention. These functions can include:

(1) Creating a set of elected entities, a selection set, and saving the selection set (e.g. "clicked state") under a potentially user-chosen name (regardless of how that "click" or selection is achieved) to form a saved selection set. In other words, the selected entities are saved as a named set (name may be chosen by the user) which is persistent such that the GUI then can be shut down and when the GUI is restarted, the saved selection sets are still available. See function 2 and function 4 below.

(2) Choosing a saved selection set to activate (e.g. select) a previously saved selection set (i.e. it is as if the user has unselected all selected entities, and then freshly, manually, one-at-a-time, selected (or "clicked") on each of the entities that were in the selection set).

(3) Manually modifying a current selection set (i.e. add or remove additional entities) and optionally saving the modified current selection set (as per function 1), either with the name of the original saved selection set or a new name.

Put alternatively, in some embodiments, the invention may further comprise adding or removing additional entities (often by input from a human user on the GUI) from any of the first selection set, the at least one different selection set, or the at least one new selection set, thereby creating any of a modified first selection set, a modified different selection set, and a modified new selection set.

Note also that in some embodiments, the invention may further comprise saving any of the modified first selection set, the modified different selection set, and the modified new selection set under any of their original names and their modified names.

(4) Loading saved selection sets from a previous session of the GUI.

(5) Optionally removing any unneeded saved selection sets.

(6) Performing simple set operations on one or more selection sets or saved selection sets (e.g. combine sets, subtract one set from an another, find common Entities in multiple Selection sets) to create new selection sets which can then be saved per function 1. These set operations are Boolean set operations, which are carried out on one or more named set of selections to compose more named selection sets. The most common ones are INTERSECTION (i.e. "AND"), UNION (i.e. "OR") SUBTRACT (i.e. "MINUS"), and INVERT (i.e. "NEGATE" or "NOT"). For example, the user "Bob" might create a selection set of files modified during the last week, and subtract from this first set the set of files that were modified by another user "Mary".

Thus, according to the invention, the one or more set operations can comprise any of set union, set intersection, and set inversion (i.e. set negation).

Note that in set-theory terminology, "union", "intersection", and set inversion (also called "set negation") form one possible "complete" group of set operations. A "complete group of set operations" means that you can express any set operation as a sequence of these more basic "complete" operations. For example, A exclusive-or B is ((A UNION B) INTERSECT (INVERT (A INTERSECT B))). Thus, for example, UNION, INTERSECTION, INVERT means also reads on an "exclusive-or" operation. Similarly, a set-subtract operation can be phrased in terms of the UNION, INTERSECT, INVERT set operations. Thus, for example, the exclusive-OR and set subtraction operations are also claimed.

(7) Tying the results of the search capability of the GUI automatically into a Selection set and a saved selection set, so that additional changes to the selection set and saved selection set can be made later, at the convenience of the user.

Put alternatively, in some embodiments, the GUI and the computer processor can be further configured to search the plurality of selectable entities for at least one GUI selectable search parameter. Here, the invention can further enable the user to use the GUI to define at least one GUI selectable parameter. The invention can then use the computer processor, this at least one GUI selectable parameter, and the plurality of selectable entities to determine any of the first selection set and the at least one different selection set.

(8) Further, in some embodiments, the invention may carry out arbitrary computationally driven decision making about the entities present in a selection set or saved selection set, either through a search feature/operation or a more in-depth method, such as a script or program, to create new selection sets which can then be saved per function 1. In the cases where set operations, paired with search operation are insufficient or imprecise, the invention allows additional reasoning about the individual entities in a selection, such that intelligent choices can be made by the processor about which entities to add or remove from a selection set. For example, the user might wish to add to (or remove from) a selection set the list of files that contain a specific marker or markers, allowing for more complex machine reasoning (such as if-then-else) about the pending entities. A possible list of traits, that may become part of the processor's decision process for selection inclusion or exclusion, includes the size of the file, date of last modification, date of creation, the file format, custom labels, user comments about the file etc. The intention here is that this last item fully allows arbitrary computation about the entities and objects under consideration.

Figure 23:
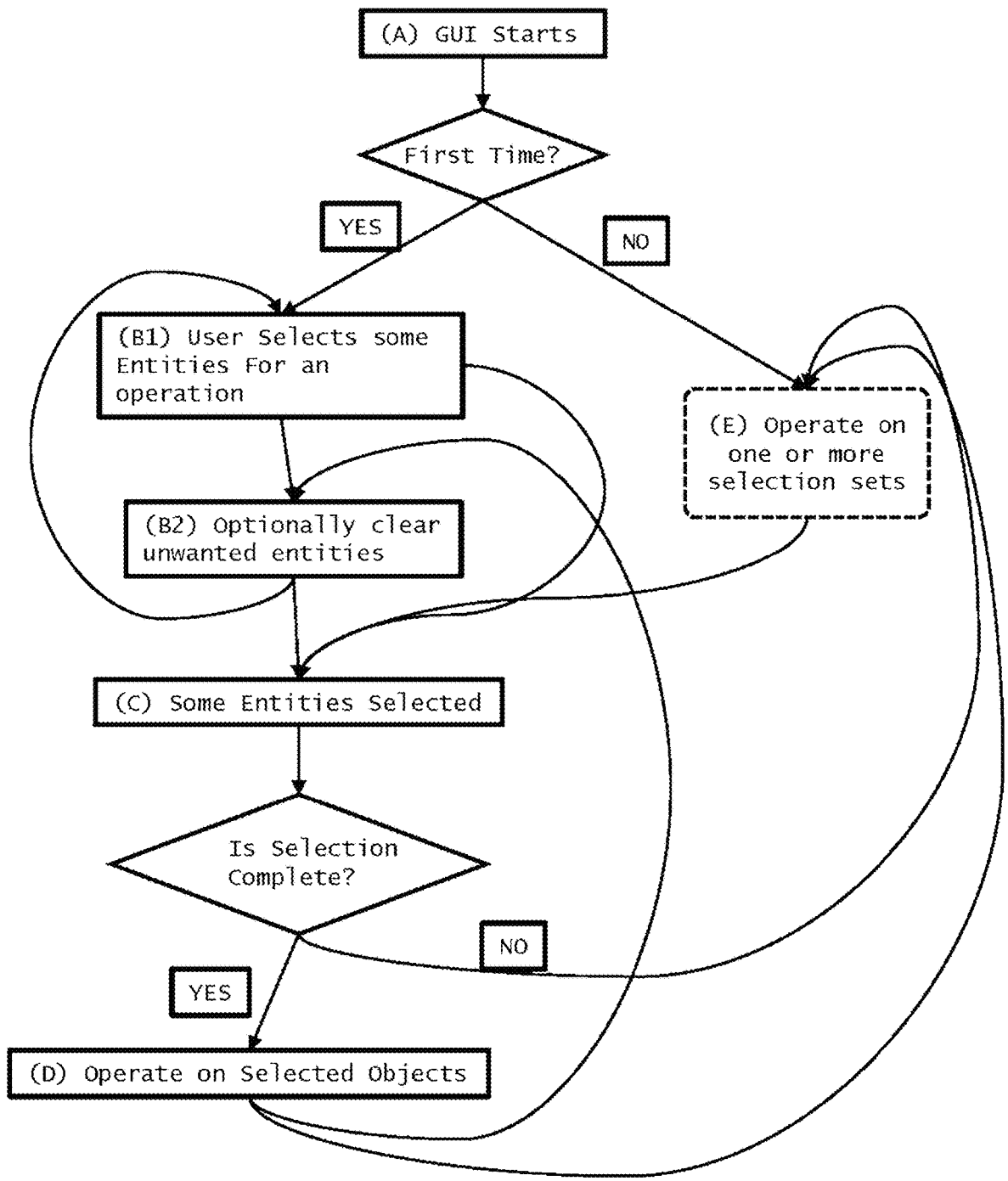
FIG. 23 shows a first flow chart of an embodiment of the invention.
Figure 24:
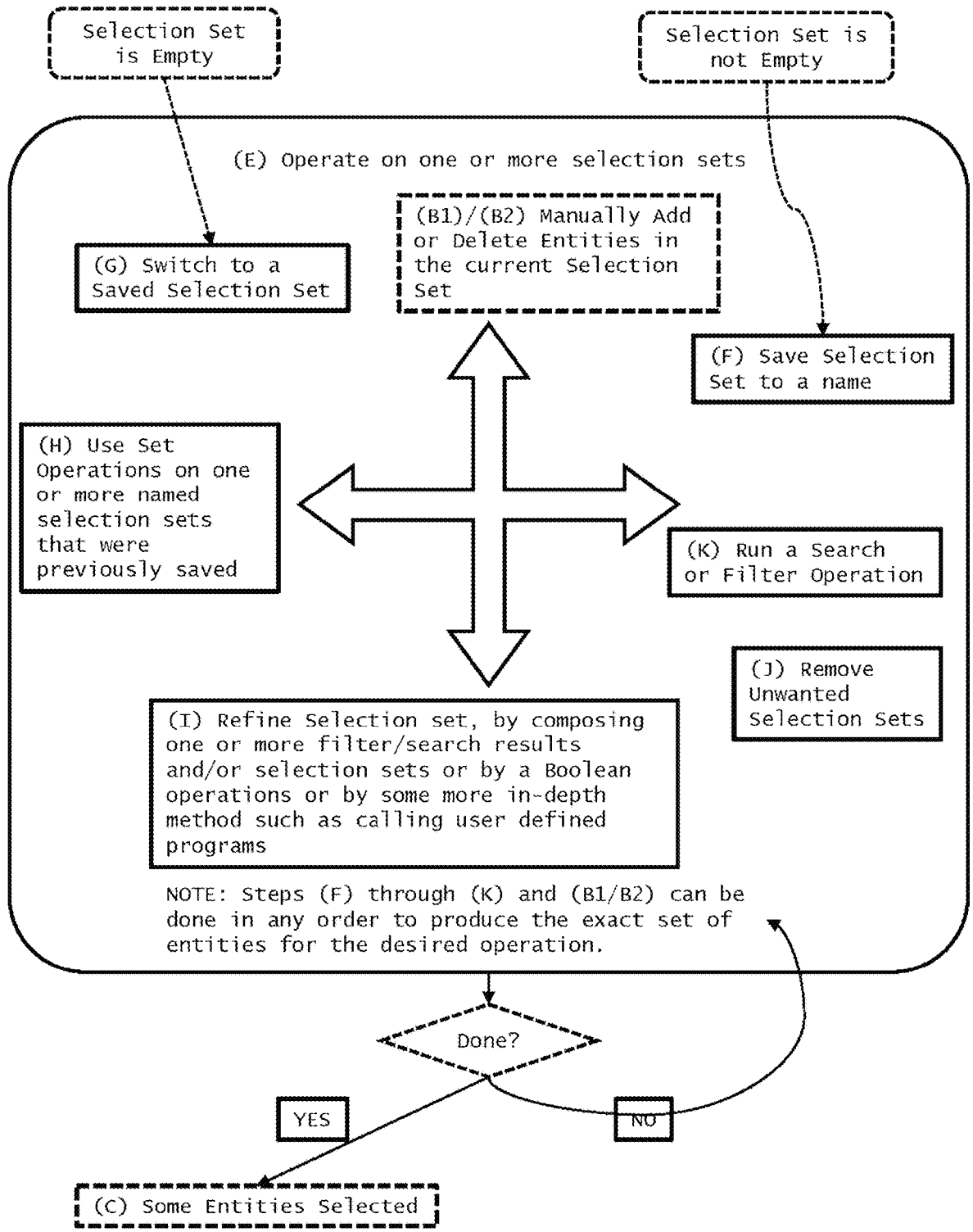
FIG. 24 shows a second flow chart of an embodiment of the invention. It focuses in on Box (E) first shown in FIG. 23. Note that the large four-pointed arrow in the center of the figure is used to simply mean that steps (F) through (K) as well as (B1) and (B2) can be done in any order.

See FIG. 23 and FIG. 24 for flow charts showing an embodiment of the invention.

Note that in some embodiments, the invention further can use the GUI and the computer processor, to create or select at least one script or program, thereby determining at least one selected script or program. Here, this at least one script or program can be configured to accept this at least one new selection set as any of input or output parameters for this at least one script or program. The invention can then use the computer processor to execute this script according to the at least one new selection set.

The user can continue adding/removing entities from any of the named selection sets created earlier. Thus, saving these modified selection sets, activating these selection sets, and operating on these selection sets (i.e. carry out a GUI operation on the selected entities, as per definition 4), as well as creating new selection sets by various means described in the functions are all possible.

When a selection set is being saved or loaded, the actual objects that the entity refers to (e.g. the linked files/directories objects) need not themselves be saved or loaded. Often, what is being saved is just enough information that signifies within the GUI that an entity is selected. That is, the selection sets are made so that the user can choose to do an operation on the selected entities (and the underlying objects) at a later point in time, as well as add/subtract new entities to the selection set to fine-tune which entities are selected for an operation.

With these capabilities in place, it becomes apparent that the task of choosing which entities to select for a GUI operation becomes significantly more powerful and less amenable to human-driven errors that can frustrate efforts to work with a large number of entities. In other words, these functions, demonstrated in the figures below, are also easy to use.

EXEMPLARY EMBODIMENTS

As discussed above, FIGS. 1 through 10 show an implemented browser GUI with the functions (i.e. various aspects of the present invention) built-in. In this case, the selectable entities (and their underlying objects) are files and directories.

Note that in some embodiments, as will be discussed shortly in more detail, the entities can comprise any of files and directories. Here, for example, the at least one new selection set can be used to perform any of memory storage operations and network transmission operations upon any of the underlying files and directories objects in this at least one new selection set.

However, in some embodiments, the entities may comprise of any object, manipulatable by the GUI, that can be selected by any methodology available to the GUI.

Note that FIGS. 1 through 10 demonstrate the invention in a file browser GUI, and thus the "selectable entities", as well as the underlying objects, are files and directories. However, there are many kinds of GUIs and many kinds of selectable entities.

Figure 8:
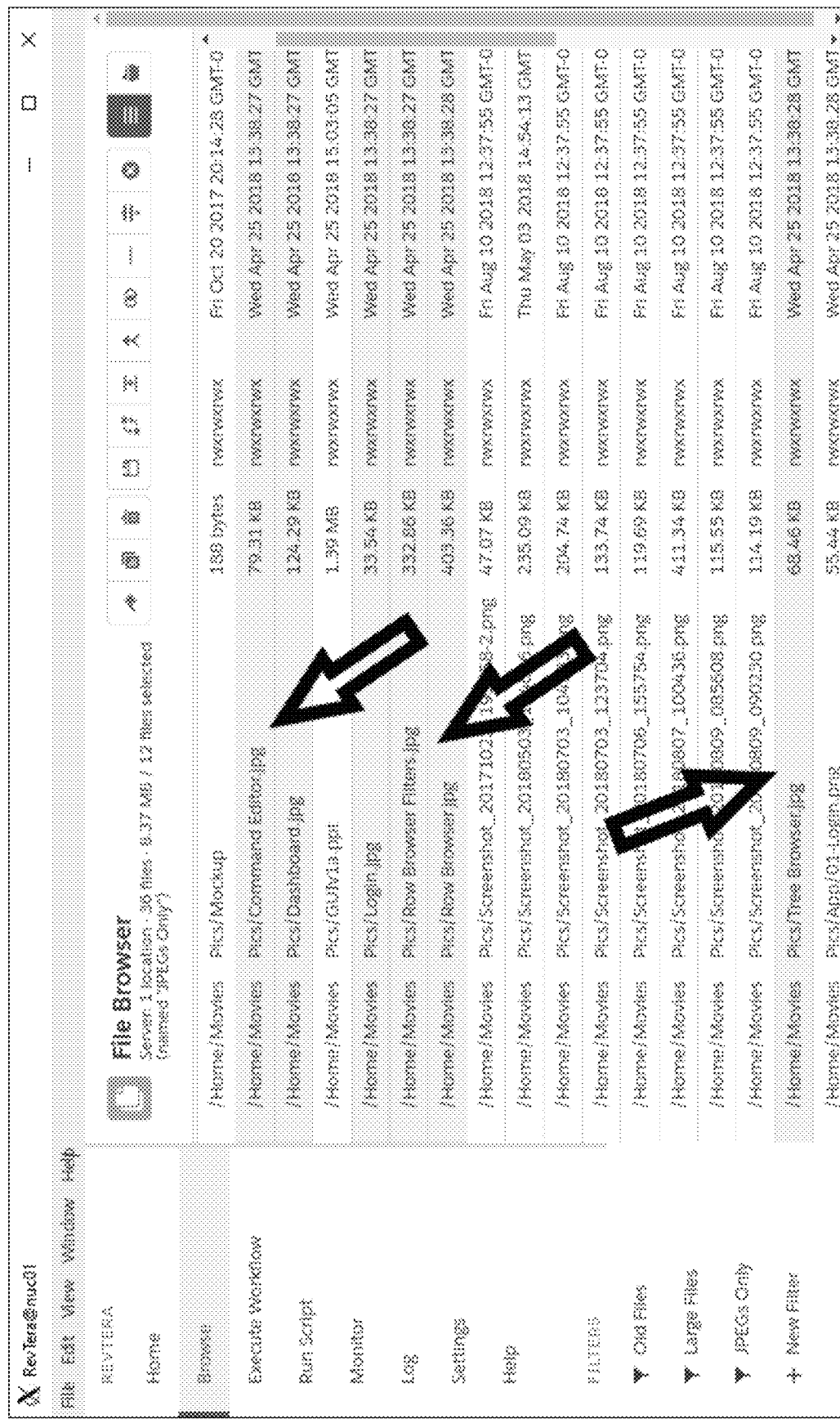
FIG. 8 shows a GUI screenshot where the user has set the "JPEGs Only" Selection set as Active.
Figure 9:
FIG. 9 shows a GUI screenshot where the user is Subtracting "Mockup JPEGs Only" from the "JPEGs Only" selection.
Figure 10:
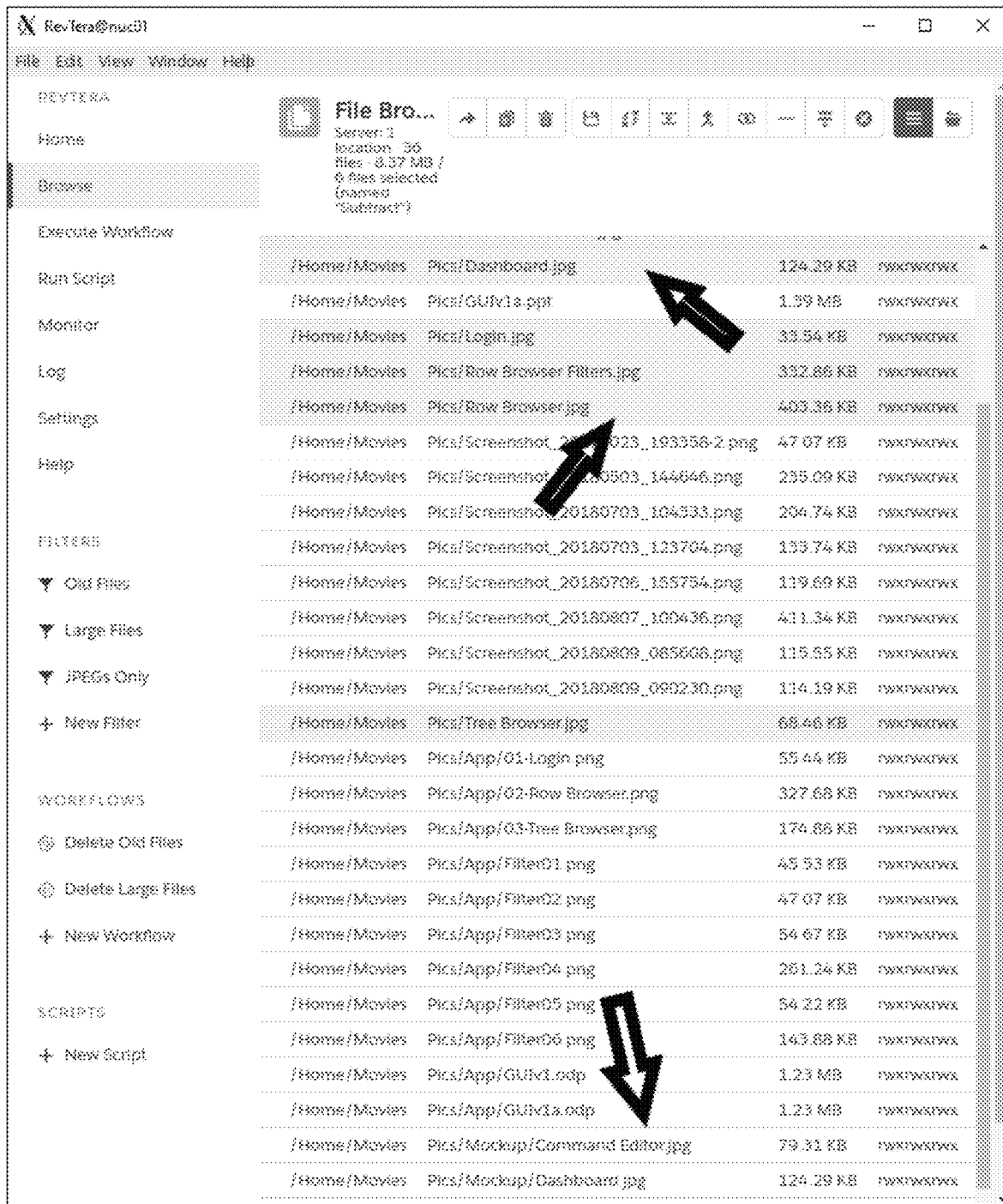
FIG. 10 shows a GUI screenshot showing the result of the Subtract operation from FIG. 9. Note that the JPEGs in the "Mockup" Directory are no longer selected.
Figure 11:
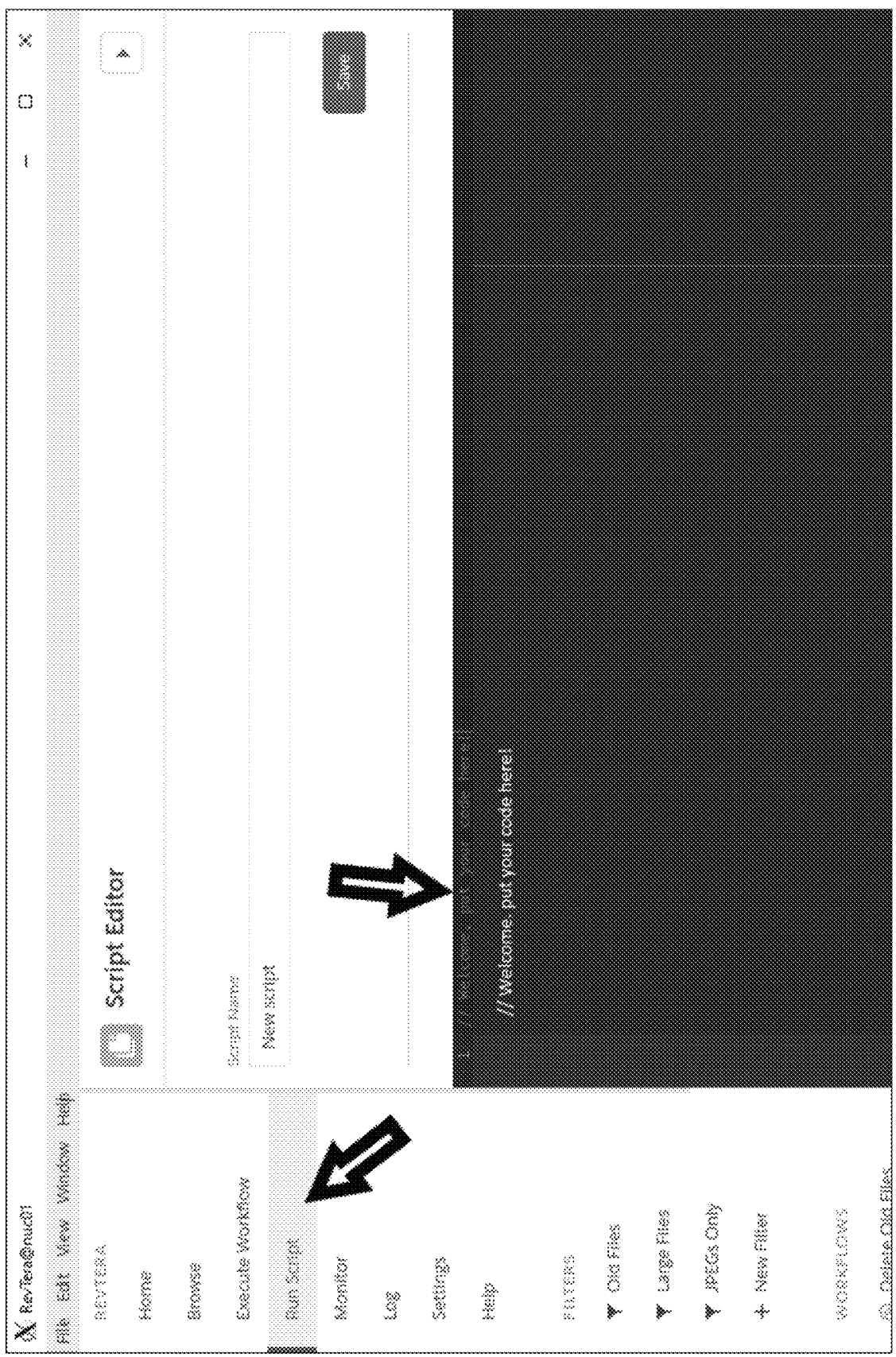
FIG. 11 shows a GUI screenshot showing the Screen for adding user-supplied functions/scripts to the GUI. These scripts can be used during the Filter operation to arbitrarily query the Objects and/or modify selection sets.

FIG. 8-10 detail set operation on selection sets. FIG. 11 shows how a scripting window (e.g. for function 8) may be used. FIGS. 12 through 16 show the application of the Invention where the selectable entities are uniform resource locators (URLs) for video streams within a web browser, i.e. they are not files in a local directory. FIGS. 17 through 22 show another example of the Claims in action where the Selectable Entities are Inventory items in a Video Game. In the figures, areas of specific interest, such as selected entries or discussed functions, are often indicated with an arrow.

In some embodiments, the entities can comprise items in a video game, where this video game can be configured to be run by any of one or more computer processors and/or at least one remote server.

Further, in some embodiments, the entities can comprise any of remotely hosted audio and video streams. Here the GUI and the computer processor can be further configured with web browser functionality, and the first selection set, the at least one different selection set, and the at least one new selection set can comprise sets comprising any of these remotely hosted audio and video streams.

See FIG. 23 and FIG. 24 for flow charts showing an embodiment of the invention.

Examples of these operations with a File Browser GUI.

FIG. 1 shows a File Browser GUI with a single file manually selected (i.e. "clicked" by the user. This single selected file is now an unnamed selection set containing one entity. The user can then choose an operation on this selected entity at any time.

Figure 2:
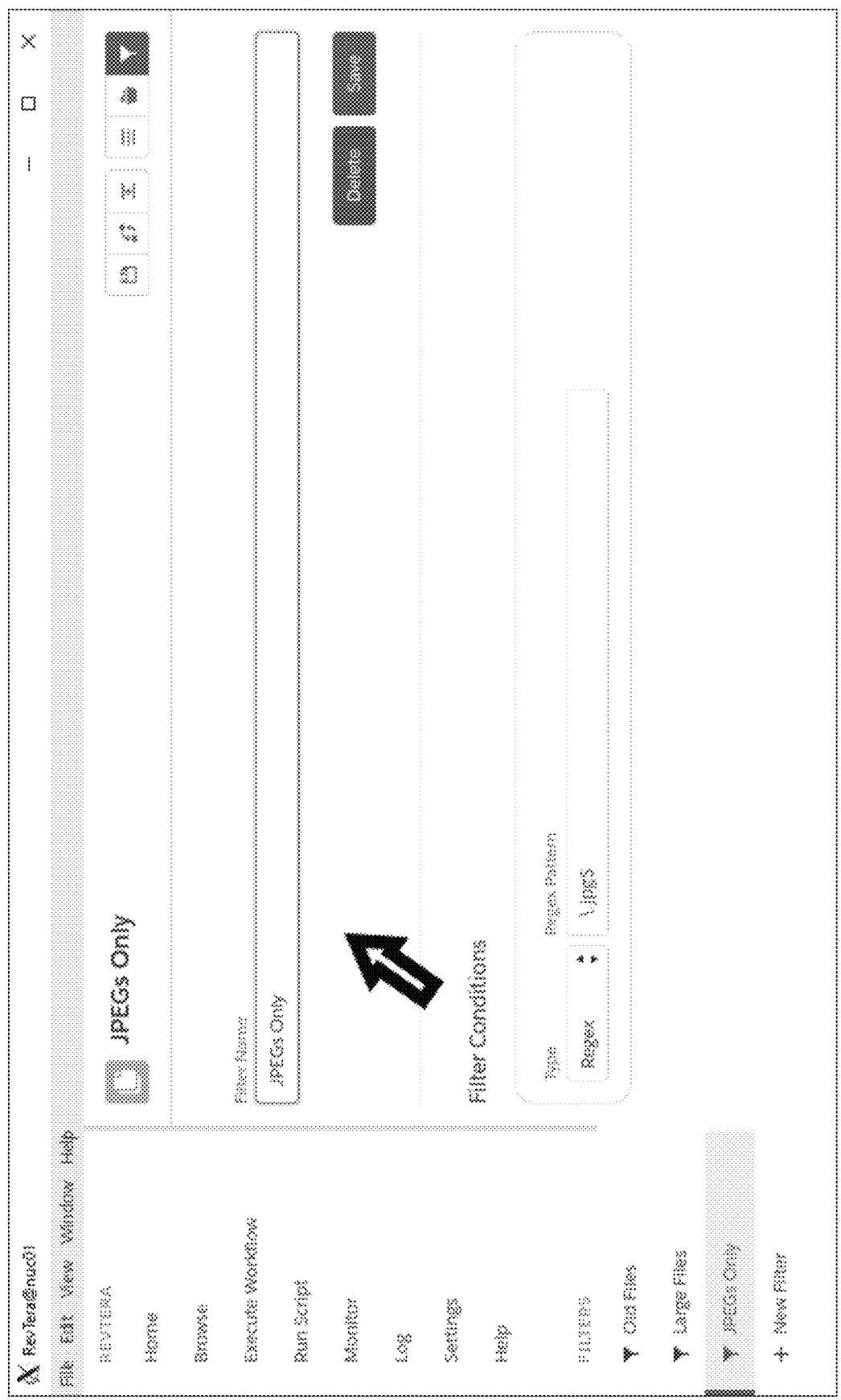
FIG. 2 shows a GUI screenshot where the user is using a "Search" operation to find JPEG files.

FIG. 2 shows using a search capability of the GUI where the user is searching for JPEG files. Clarification: In the nomenclature used by the GUI, a "Filter" is used to "filter" the Entities for the desired items, i.e. Filter is-a Search.

Figure 3:
FIG. 3 shows a GUI screenshot showing the result of the FIG. 2 Search operation. Note that Files other than JPEGs are hidden from view.

FIG. 3 shows the result of the search. Notice that files other than JPEGs are hidden from view. This tying of search results to selection is a crucial function of this invention. Typically, searches are for finding entities with a specific trait. This function allows for the result of multiple searches to be saved as selection sets, allowing for the user to more efficiently generate the desired selection sets by incorporating multiple searches, manual modification as well as arbitrary computation. Examples of functions 5, 7 and 8 are below.

Figure 4:
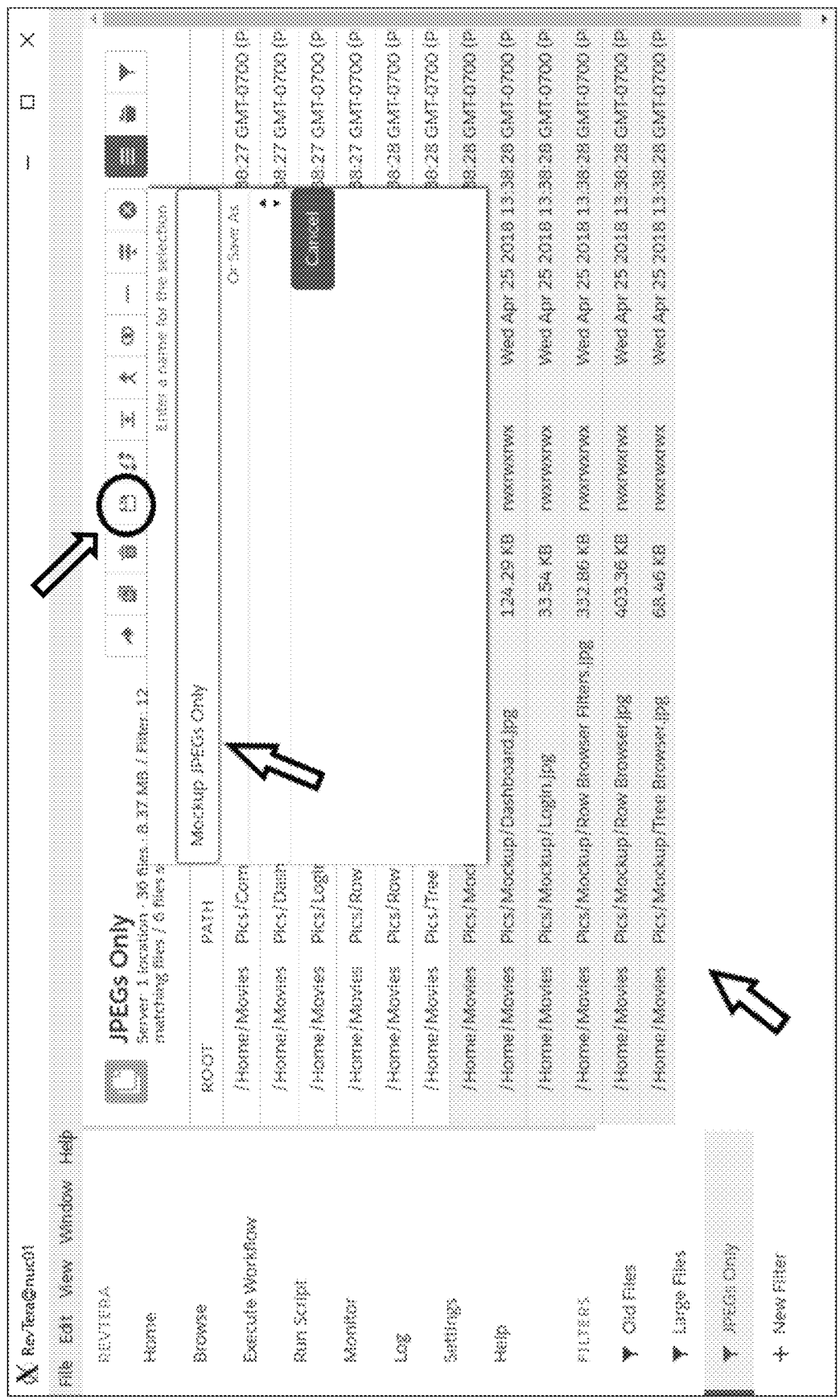
FIG. 4 shows using a GUI to save a Selection Set. Here the user has selected a subset of the search and is saving the subset as "Mockup JPEGs Only".

In FIG. 4, the user is creating (and saving) a newly named selection set from JPEG files in the Mockup directory. In this case, the user has manually selected (or clicked on) the rows that signify "Mockup/" and is creating (and saving) the selected rows. Note that the files themselves are not being saved here (they are already there!). What is being saved is the information that signifies that JPEG files in the Mockup directory have been selected (e.g. "clicked on") by the user, and that the selection set is given a name for future use and reference by the user. The circled button near the top (resembling a floppy disk) was pressed to activate the shown dialog.

Figure 5:
FIG. 5 shows a detail of the selected "JPEGs Only" selection set previously selected in FIG. 4.

In FIG. 5, the user changed the active selection set to "JPEGs Only". Notice that JPEGs in the Mockup directory, as well as JPEGs outside the Mockup directory, are selected.

Figure 6:
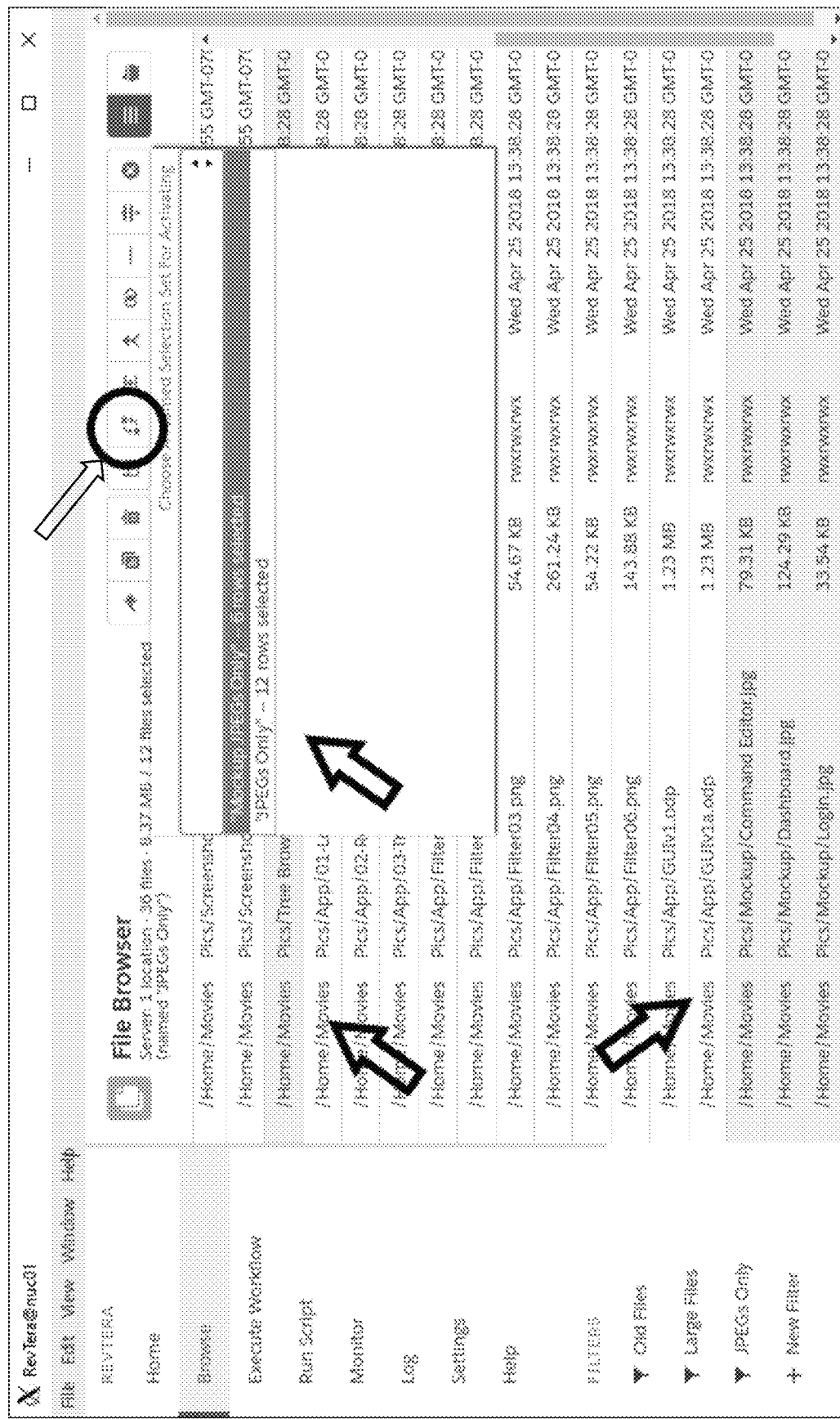
FIG. 6 shows a GUI screenshot of the user changing the Active Selection (To "Mockup JPEGs Only").

In FIG. 6, the user is changing the active selection set to "Mockup JPEGs Only". The button indicated by the circle and arrow near the top was pressed by the user to activate the shown dialog.

Figure 7:
FIG. 7 shows a GUI screenshot of the result of the user Changing the Active Selection Set to "Mockup JPEGs Only".

FIG. 7 shows the result of the operation in FIG. 6. Notice that JPEGs in Mockup directory are still selected, but other JPEG files are no longer selected. i.e. the selections have been reset to be identical to that of FIG. 4. (For example, note that "Tree Browser.jpg" is no longer selected)

As stated earlier, the selection set is not the files/directories, but rather is a type of short-lived ephemeral metadata pertaining to the "clicked" state of the individual Entity (which is, in this case, a row element that contains some detailed information about the file). The process of creating, saving, naming, modifying, or deleting the selection sets does not actually impact the selected entities (in this case files and directories) at all. What is being saved is metadata pertaining to whether or not a particular entity was selected, as well as the given name for this set. The underlying files/directories objects are only modified when the user chooses to carry out an operation on the selected entities that link to these underlying objects.

In other words, once the user has clicked/selected at least one file or directory (which is automatically a selection set (of size 1), the user can choose to operate on the selected entities. In the early FIGS. 1-7, such operations are what you might expect from a file browser—i.e. copy/move/rename/delete/make new directory etc.

FIGS. 8-10 demonstrate the power of set operations in modifying Selections

FIG. 8 shows the "JPEGs Only" selection set is activated. Notice that the JPEG files (including the ones in the Mockup directory) are selected.

FIG. 9 shows the initiation of a set subtract operation, where the "Mockups JPEGs Only" selection set is being chosen to subtract from "JPEGs Only". The button indicated by the circle and arrow (resembling a "minus sign") was pressed by the user to activate this function.

FIG. 10 shows the resulting selections, where the JPEGs NOT in the Mockup directory are still selected. Note that the resulting selection has been saved to a new selection set named "Subtract". Other operations that are featured are the expected common set operations like "intersect" (find common entities), "union" (add entities from one set to another), "select all" (select all entities that are in the current view), "exclusive or" (all entities in one set but not in another), and "invert" (flip the selection status of all entities in the current view). Note that the current view, as demonstrated prior as well in the following figures, can be the default view, or the result of a filter operation. One advantage of the invention's improved functionality here is that with set operations, and the ability to have multiple named selection sets, the invention provides greater ease-of-use and improved file management capability.

FIG. 11 shows the interface in the GUI where the user can supply a program or script. One of the uses of these scripts is during the filter process (i.e. function 8). Here, the script can query the objects (i.e. what the selectable entities link or refer to). The invention can use this information to make choices about which entities are found as part of the search/filter process, as well as directly modify selection sets. The scripts can also be used to program (implement) a wider range of actions that might otherwise be difficult to compose directly with the GUI.

FIGS. 12-16 show an Embodiment where the selectable entities are URLs (uniform resource locators) for video streams within a web browser (e.g., the underlying objects are not merely files in a local directory). In this case, the operations involve video URL operations, such as play videos in sequence, etc.) These figures are also screenshots of the same software used to generate the prior figures.

Figure 12:
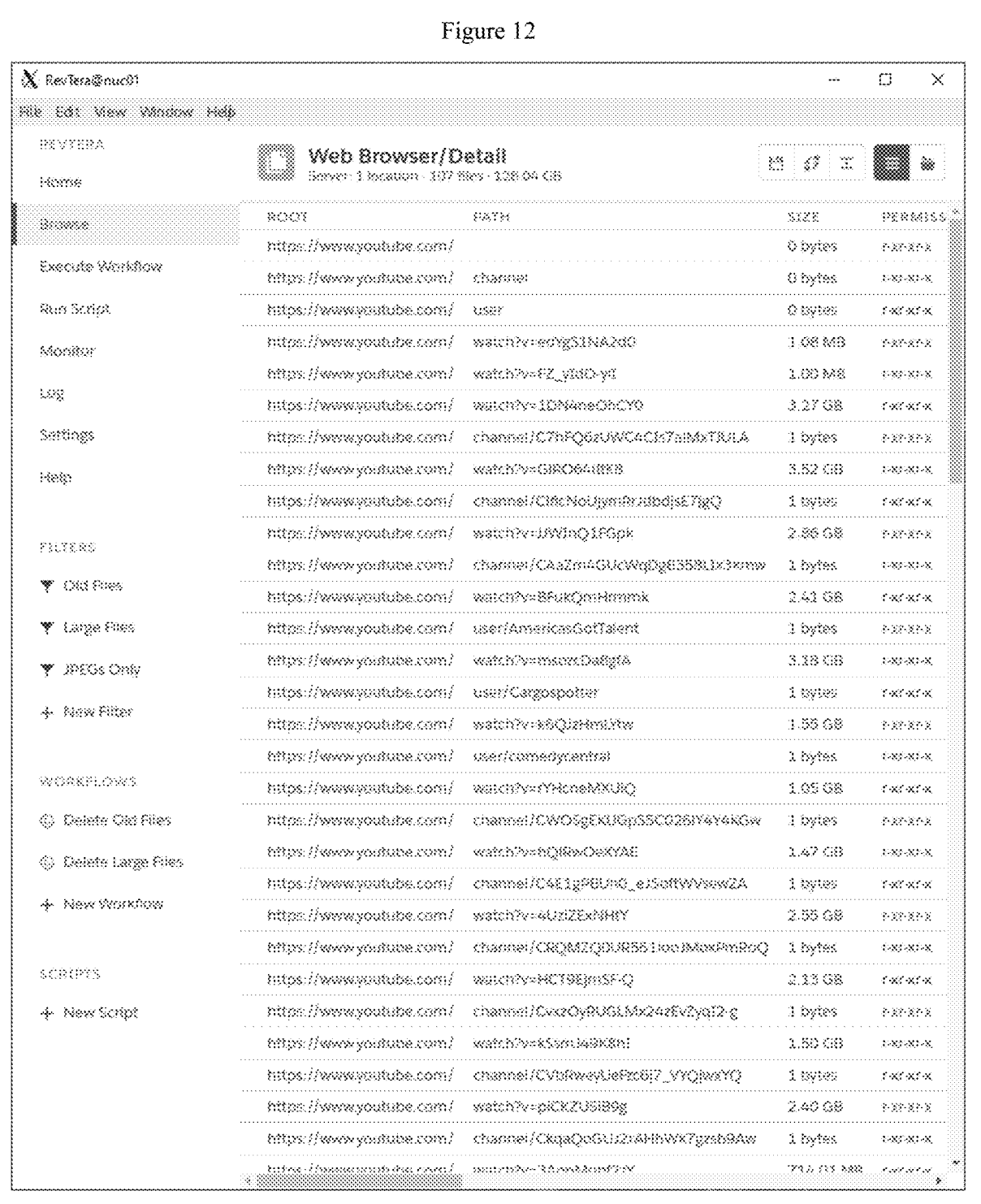

FIG. 12 shows the front page of a popular website youtube.com as rendered by the invention's browser in detail view. The actual URLs and file sizes have been intentionally mangled for diagram purposes.

Figure 13:
FIG. 13 shows Creating a new filter for Video Streams less than 1 GB in size.

FIG. 13 shows a filter where the user is selecting the video streams that are less than 1 GB in size.

Figure 14:
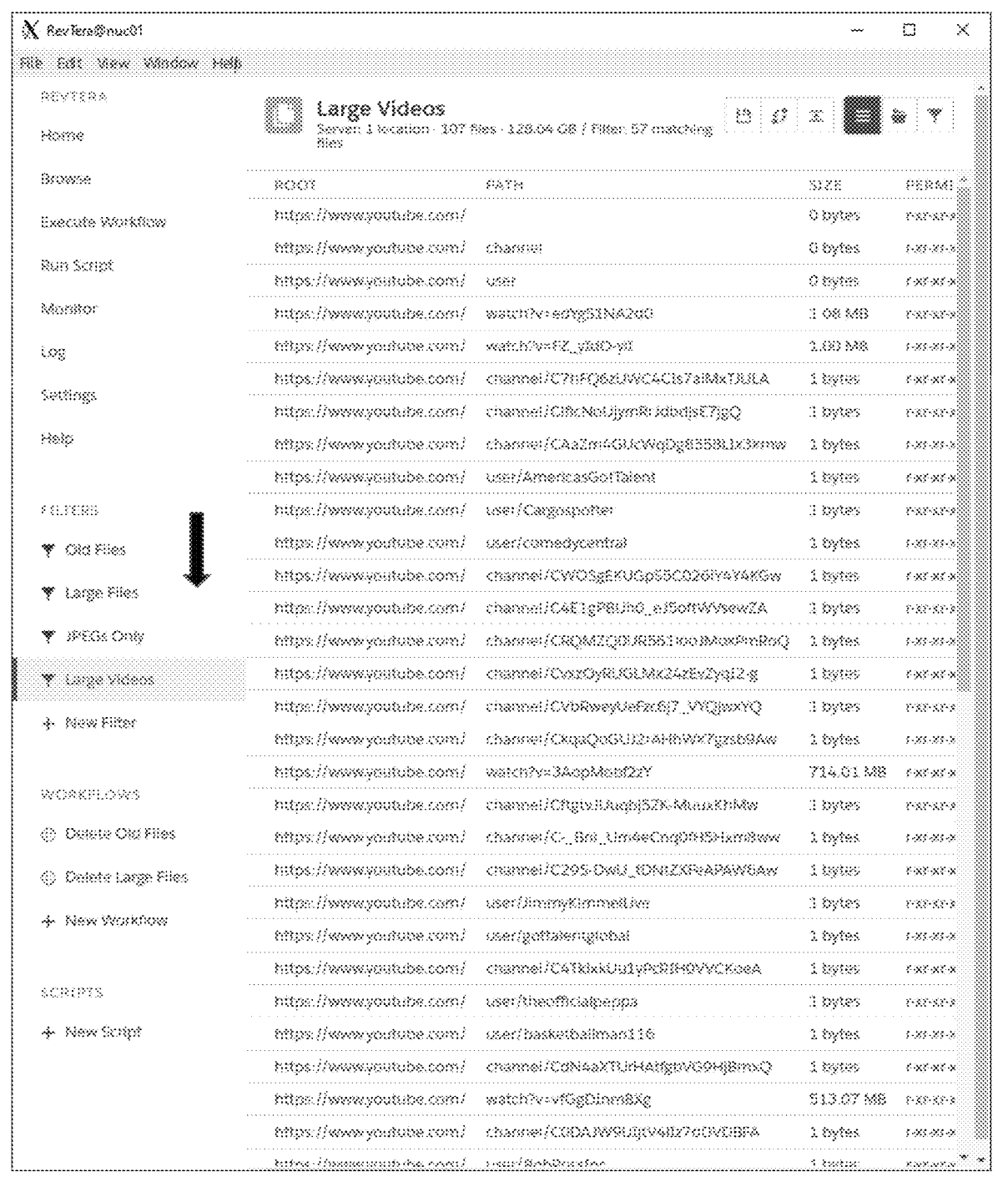

FIG. 14 shows the results of the search where a bunch of unneeded URLs (these mostly are for category pages) are showing up.

Figure 15:
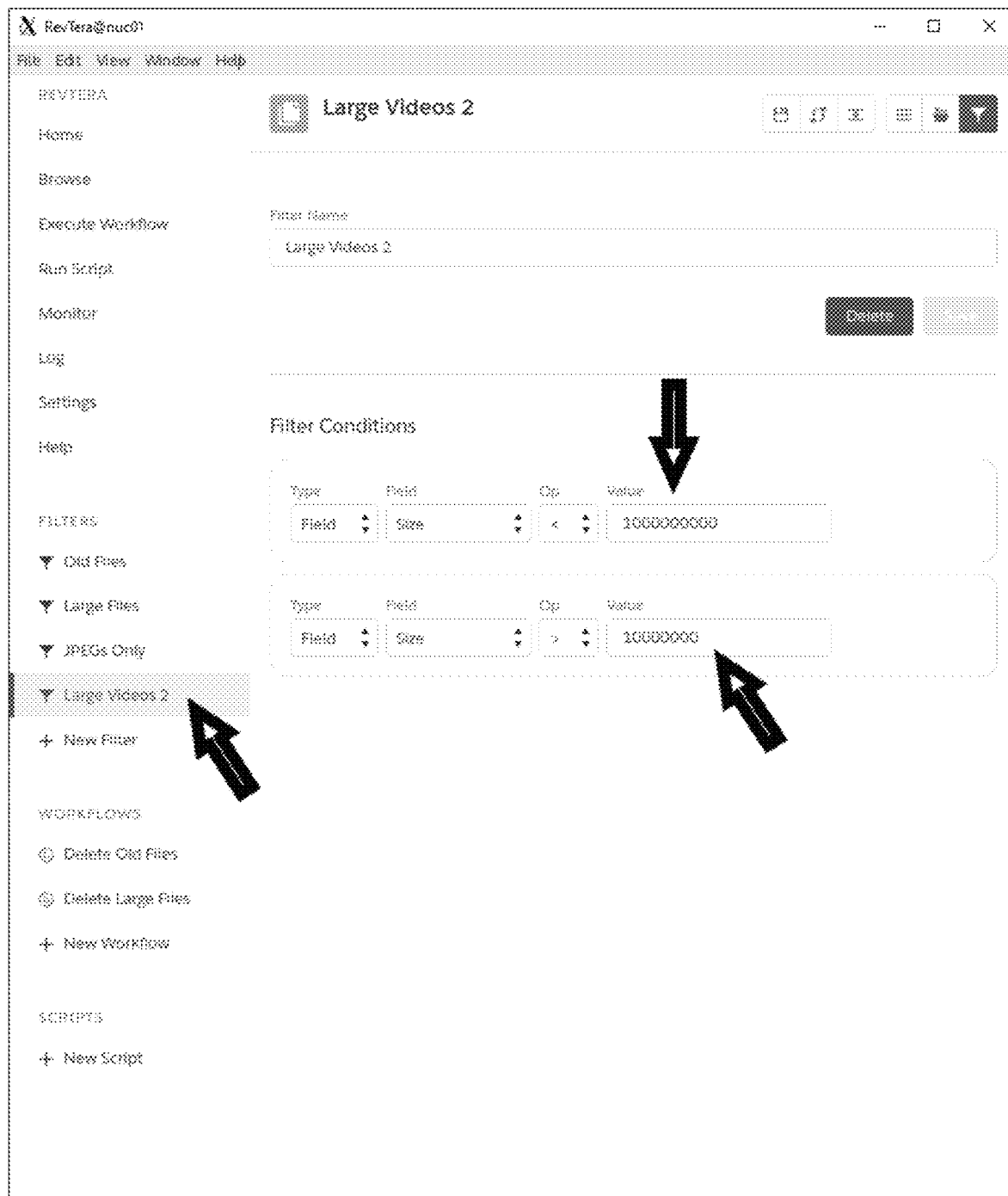
FIG. 15 shows creating a "filter chain", according to function 8 (described below in Detailed Description Section).

FIG. 15 shows an exemplar of the invention's function 8, which is the catch-all capability where additional computation can be done to drill down on the specific desired entities. In this example, the user has modified the search to be a chain of two filters, where the first filter selects all URLs that point to video streams less than 1gigabyte (GB) and the second filter selects those with sizes greater than 10,000,000 bytes.

Note that chaining filters (or searches) is not the only way to implement function 8. In some embodiments, this aspect of the invention can also be used to support arbitrary code (i.e. a script or program). This code can be inserted into the filter-select loop, which can then direct the computer processor to automatically query the entities (and objects) in arbitrary ways to reach a decision on selection.

In some embodiments, essentially any arbitrary user-supplied function can be invoked during the filter-selection loop. Thus, in some embodiments, function 8 can be "computationally complete". In other embodiments, however, it may be useful to limit function 8 to a "sandbox" subset of functions or otherwise limit the functionality of function 8 to protect the user from inadvertent mistakes, or for higher security.

Figure 16:
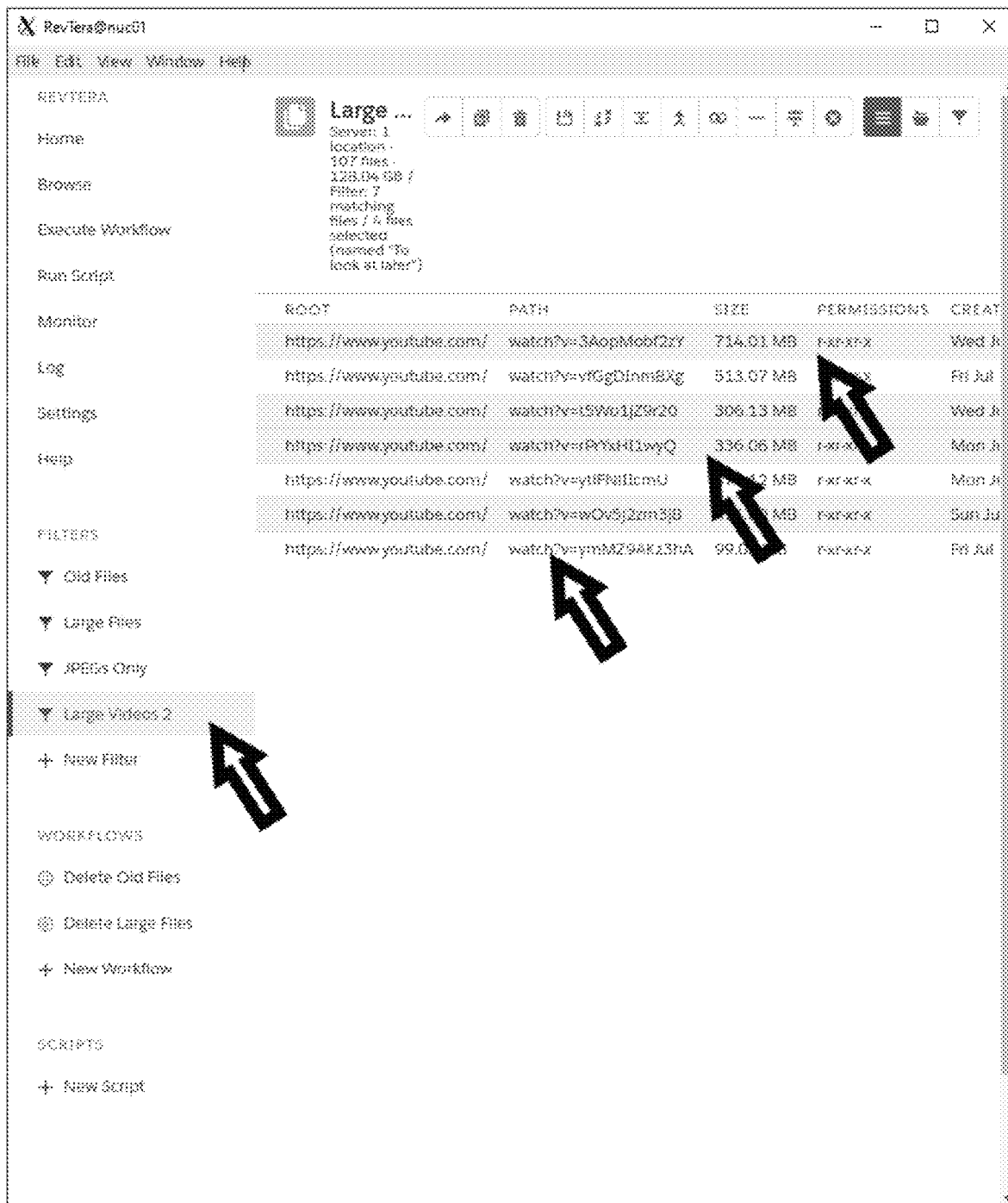
FIG. 16 shows the result of applying the filter chain (shown on FIG. 15) (an exemplar of function 8), thus creating a new selection set.

FIG. 16 shows the results of a filter chain, where meaningful video URLs of the specified sizes are shown. Several URLs are then manually selected and is saved as a selection set named "To look at later".

FIGS. 17-22 shows a hypothetical GUI for a video game. In these figures, the selectable entities are inventory items of the game character. A "game character", in this case is the fictional person, in-game, that is under the control of the user (i.e. player) of the video game. Inventory items are the ephemeral objects within the video game that the game character has somehow acquired through play.

FIG. 17 shows an inventory screen where the user (or player, in this case) is searching for metallic ores. Here the user has highlighted 3 ores. Copper ores and tin ores are shown as selected. One of the three selected ores is not shown in the Inventory listing.

Figure 18:
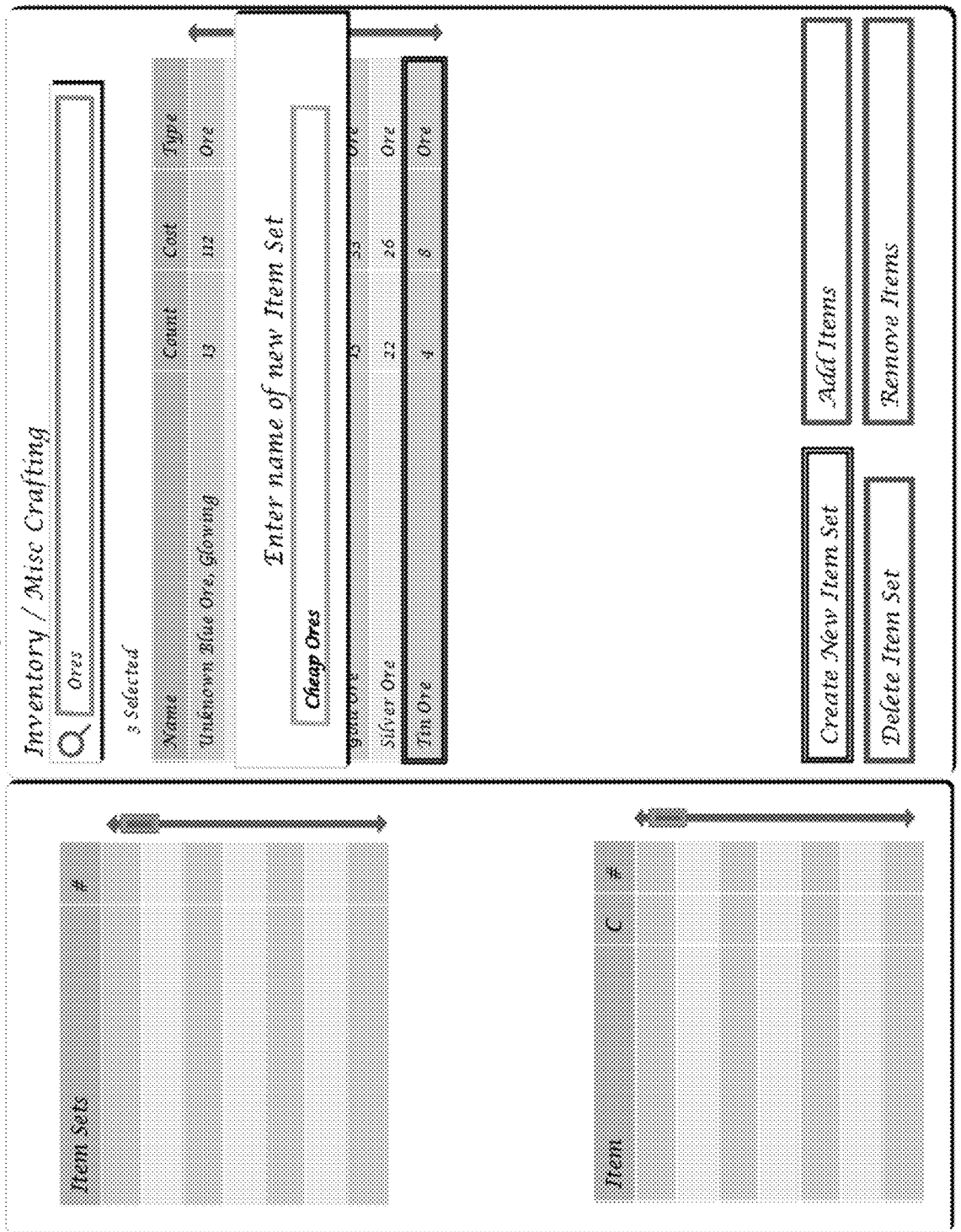
FIG. 18 shows creating a new item set "Cheap Ores" for the video game of FIG. 17.

In FIG. 18, the "create new item set" button is Active. Thus, the player has elected to create a new "Item Set", i.e. "selection set" in this milieu. This item set is called "cheap ores".

Figure 19:
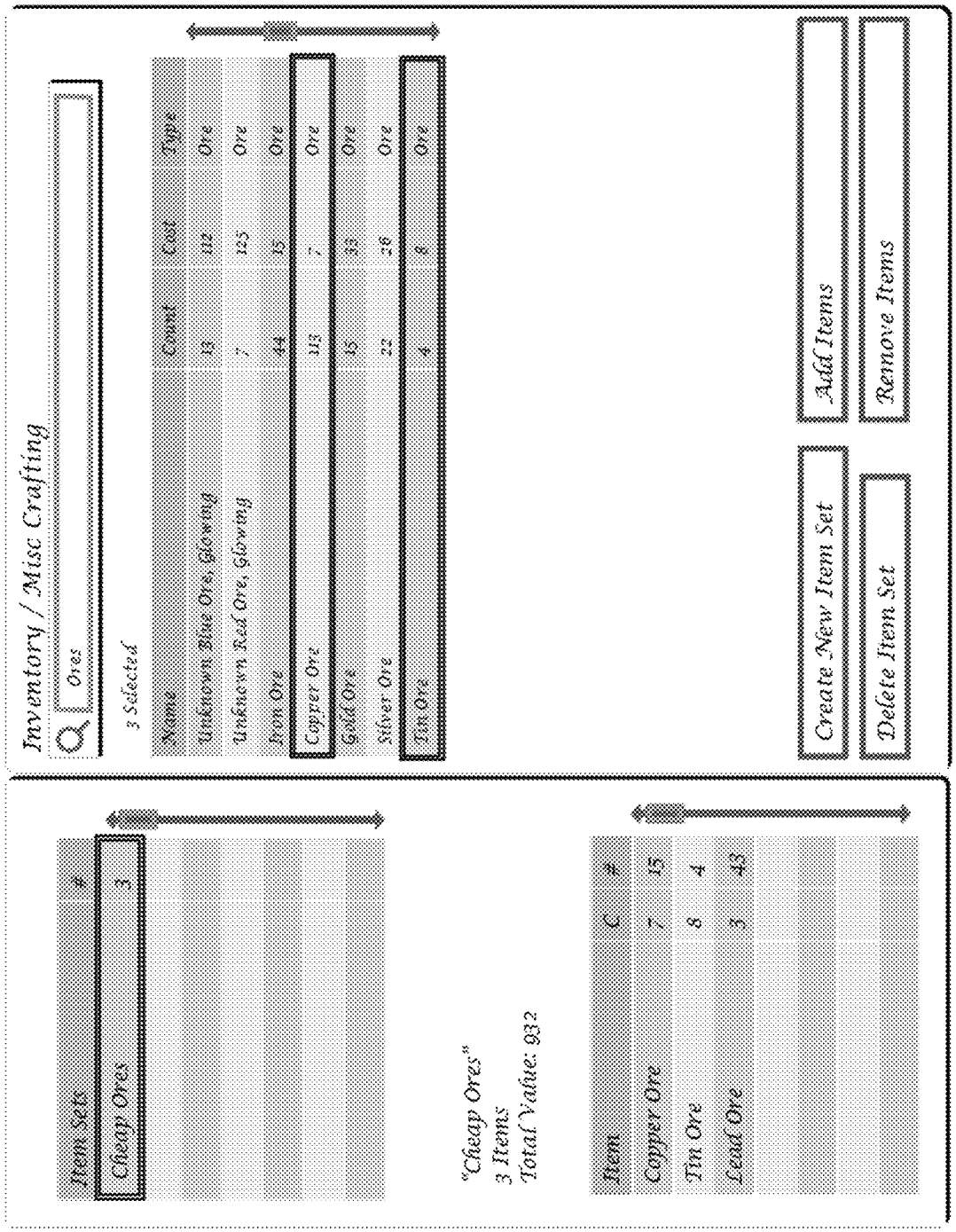
FIG. 19 shows the result of creation of the "Cheap Ores" item set from FIG. 18.

FIG. 19 shows the results of the creation of this item set. On the bottom left, the three selected entities (i.e. inventory items, in this milieu) are shown. They are copper, tin, and lead ores. FIGS. 16-18 are exemplars of function 1, 2, 3 and 7.

Figure 20:
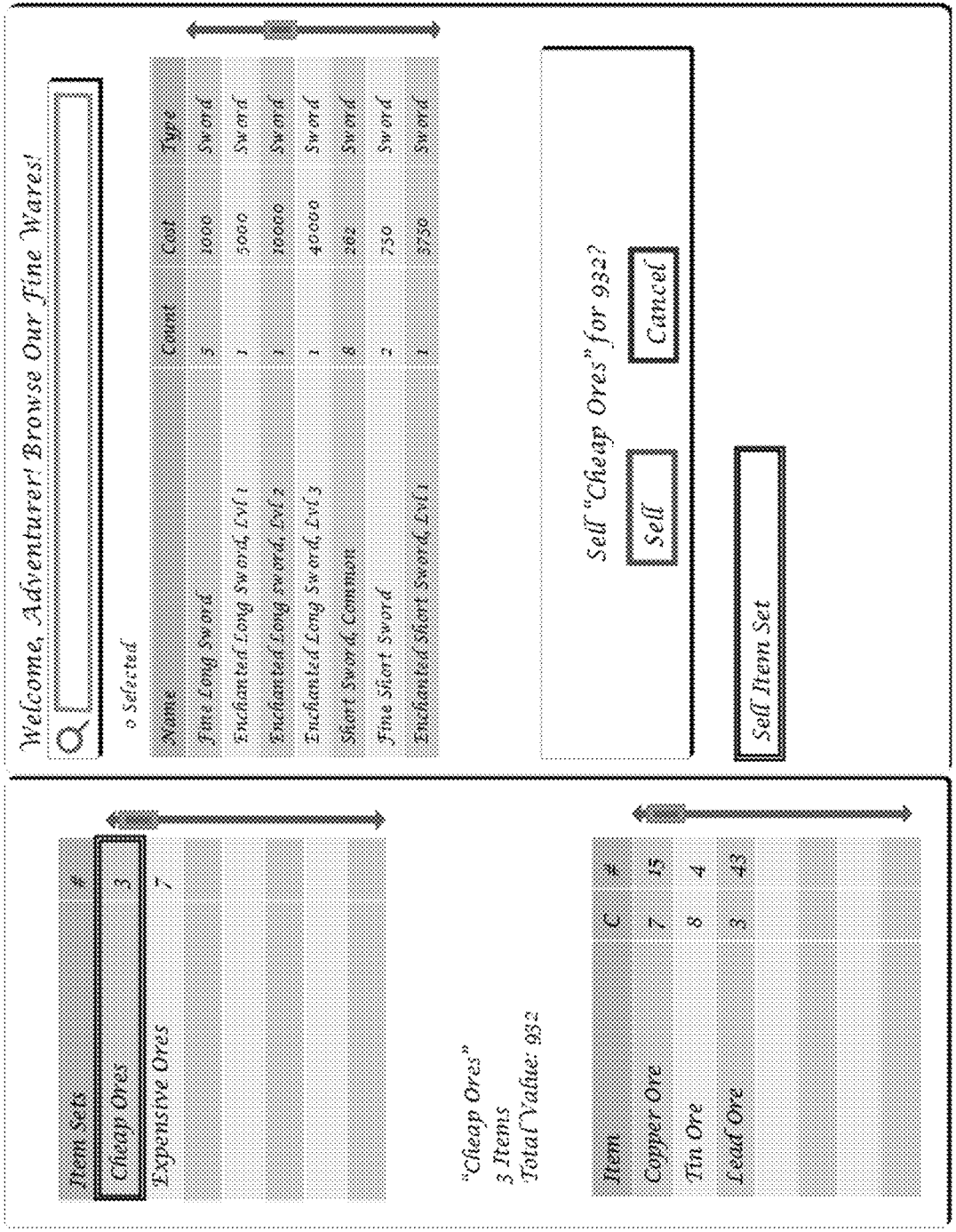
FIG. 20 shows the result of visiting a shop, and selling all of the "Cheap Ores" from FIG. 19

In FIG. 20, some time has passed, presumably, and the game character under the player's control is visiting some shop, where some of the items for sale in this shop (weapons, in this case) is listed in the main browser on the upper right. Also, the previously generated "cheap ores" item set has been selected, and the user is executing a sale of these items in "cheap ores." Notice that there is a second item set, called "expensive ores" which the user has created (sometime between FIG. 19 and FIG. 20).

Figure 21:
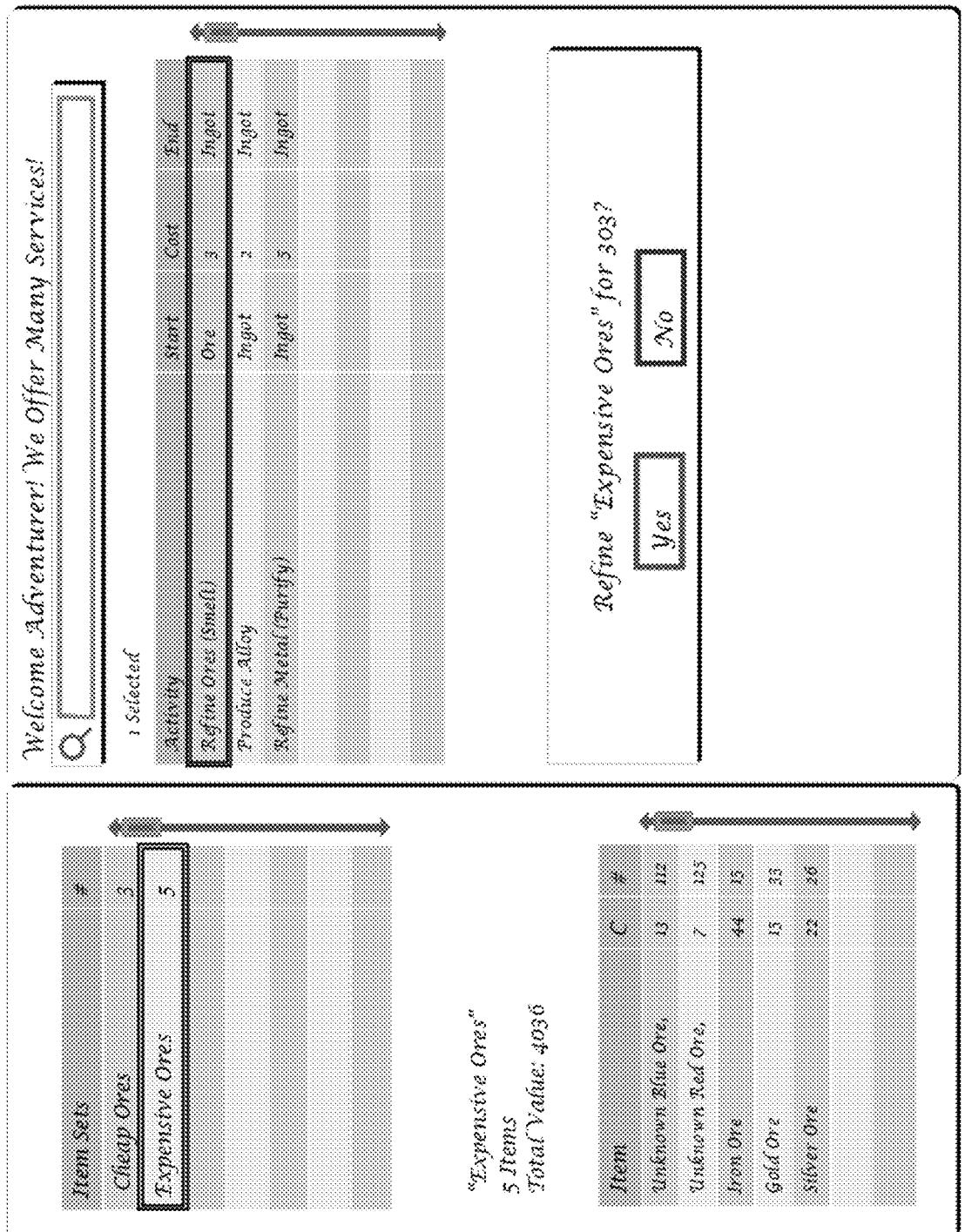
FIG. 21 shows the result of visiting a different shop, and performing the operation of refining all "Expensive Ores".

In FIG. 21, the game character is visiting a different shop, where the action being contemplated is to refine the ores in the "expensive ores" to produce ingots, presumably for some future crafting use.

It is reasonable to assume that like in FIGS. 20 and 21, if the game character receives more items that match the item sets as the game progresses further, the shops can then be revisited, and the same operations on the objects (e.g. sell "cheap ores" in FIG. 20 and "refine ores" in FIG. 21) can be re-executed by the player without needing to recreate the selection sets. This is exactly what happens in FIG. 22, where the player is revisiting the first shop and selling off both "cheap ores" and another item set called "junk". This set has things like "broken broom" (i.e. is "junk", as collected for cheap salvage in many different video games).

Note that even though this hypothetical UI in FIGS. 17-22 is inspired by video games, this kind of interface can easily be adapted to the needs of many businesses that buy and sell commodities of all kinds.

Flow Charts:

FIGS. 23 and 24 describe the operational flow diagram of the GUI, as experienced by the user, in one embodiment of the invention. As shown in FIG. 23, in most GUIs, the user starts the GUI (Box A) and starts work by choosing some entities to operate on (Boxes B1 and B2). Once the user deems that the selected entities are exactly the ones desired (as well as having no undesired entities), the user initiates the work by invoking the desired operation on the selected entities (Boxes (C) and (D)). Box (B1) and Box (B2) are where users typically would spend the majority of time interacting with the GUI. As the number of selectable entities increase, the task of selecting exactly the desired entities for operation becomes a much more burdensome task.

In a GUI that implements a preferred embodiment of this disclosure (examples of such an implementation were presented in the previous figures), the user has the option of employing the various functions described herein to enhance productivity, especially if the number of selectable entities is unwieldy.

FIG. 23 shows the top-level view of the operational flow diagram of the GUI.

Once some number of entities are selected, the user must decide whether all of the desired entities were chosen and that no undesired entities remain in the selection set. If the answer is YES, then the user initiates the desired operation via box (D). If the answer is no, the user would jump to box (E). Box (E) is described in detail in the next figure.

Boxes (A) through (D) show a typical workflow when the number of selectable entities are small and manageable. However, if the number of selectable entities is large or the exact desired entities must be discovered, then the enhancements as diagramed in box (E) can greatly enhance productivity, as well as reduce user frustration.

FIG. 24 expands on the box (E) shown in FIG. 23. This figure shows how the invention can then operate on one or more selection sets. If the selection set is empty, the invention then can switch to a saved selection set (Box G). If the selection set is not empty, the invention can then save the selection set to a given name supplied by a user. As per B1 and B2, the user has the option to manually add or delete entities in the current selection set, and/or use set operations on one or more named selection sets that were previously described (Box H). The user can also direct the invention to run a search or filter operation (Box F), and/or refine a selection set by composing one or more filter/search results and/or selection sets, or by Boolean operations or other in-depth method, such as calling user defined programs (Box I). The user can also direct the invention to remove unwanted selection sets (Box J). As stated earlier, the large 4-point arrow in the figure signifies that these steps can be done in any order to produce the exact set of entities for the desired operation. In other words, steps (F) through (K) and (B1/B2) can be done in any order for these purposes.

When the user is done, the invention will have a set of selected entities (Box C), from which the user can invoke the desired operation on said selected entities.

Additional Discussion:

The present invention may thus comprise an improved GUI equipped to implement at least some of the various combinations of the previously described functions 1-8, here described again in the list below.

(1) Creating a set of selected entities, (a selection set), and to save the selection set as a named selection set.

(2) Activating (if needed) a selection set previously saved (3) Optionally manually modifying the current selection set (4) Loading any saved selection sets from a previous session of the GUI, (5) Removing any unneeded saved selection sets, (6) Performing set operations on one or more selection sets or saved selection sets, (7) Tying the results (or a subset of the results) of any search capability of the GUI automatically as a selection set.

(8) Carrying out arbitrary computationally driven decision making about the entities present in a selection set or saved selection set, either through the search feature or a more in-depth method, such as a script or program, to create new selection sets, or modify existing selection sets, within the context of a Graphical User Interface.

As stated earlier, there are many kinds of GUIs and many kinds of selectable entities. In some embodiments, the invention described herein may be fully independent of the GUI technology, such as the GUI's "look-and-feel", and the specific selection technique used by the GUI. Some embodiments of the invention may also be fully independent of the minutiae of GUI operations—(e.g. whether a "button" is pressed by the user to change the selection set, or whether there is a "drop down menu", or whether there is a context-sensitive "pop-up window" that the user engages with). Thus, in some embodiments of the invention, the actual presentation, the visual cues, the iconography, the display devices and their related methods and systems, the interactive devices and their methods and systems being used with (or embody) the GUI need not impact the applicability of the invention. In other words, at least some embodiments of this invention may apply to all types of GUIs, no matter the specific GUI form or function.

It also follows that the location, nature, devices, systems, principles, and methods that pertain to the embodiments of the Entities (i.e. Objects in Definition 3) that are represented by a GUI as selectable entities may not always be relevant to the application of this invention. In other words, some embodiments do not distinguish between the machine that the GUI is executing on and the location of the objects that the entities refer to. In both groups of FIGS. 1-11 and 12-16, the GUI was executing on a common Windows server but the objects (files and directories) in FIGS. 1-11 were hosted on a different (Linux) server, but it could just have easily been hosted on the same Windows PC that the GUI was executing on. It could also just as easily be the reverse (i.e. GUI executes on a Linux server, but the objects are stored at a different Windows server). The objects in FIGS. 12-16 that the URLs refer to are actually hosted at a remote website youtube.com but it could just as easily have been hosted somewhere else. For example, in some embodiments, the GUI could initiate network transmission of the objects in question, as well as modify the objects through memory storage operations, executed either locally (if the objects are local), or through some method of communication between one or more servers (if the objects are not locally accessible). In some preferred embodiments, the operations featured by the GUI for managing/manipulating the objects may not always be relevant to the functions (described above) on the selectable entities that a user may elect to invoke.

Some embodiments of the invention may also apply regardless of the actual purpose, or role of the GUI (e.g., whether or not the GUI is a file browser, a video game, a web browser, or a custom tool for managing robots, cars, or whether it's a tool for executing just-in-time inventory management for factories and warehouses.

Some embodiments of the invention may also apply regardless of the extra feature sets (e.g. functions) employed by the GUI. For example, the GUI used to generate FIGS. 1-7 includes some ease-of-use shortcuts (e.g. results of a search is automatically saved as a selection set of the same name). Some embodiments of the invention may also apply regardless of whether such ease-of-use shortcuts are featured. Here, the key issue is if the GUI offers, to the user, the capability to create selection sets (through various means), save the selection sets (with names), load the selection sets sometime later, manipulate the selection set as needed through various means, and finally operate on the selection sets as desired.

The GUI tool pictured in the Figures may be implemented using computation time-efficient, as well as storage-space efficient methods and techniques for representation of the selection set as well as other components of the GUI. Thus, some embodiments of the invention apply regardless of the efficiency (or the lack there-of) of the underlying systems and methods that implement the named selection set mechanism and other components of the GUI.

It should thus be evident that the present invention is generally applicable across a variety of situations, and also improves upon the usability of prior art GUI when the user must deal with a significant number of selectable entities.

Sets of Selection Sets:

In some embodiments, including some preferred embodiments, the invention may be configured so that selection sets themselves may also be selectable entities. Thus, the GUI features discussed herein for selectable entities can also be used to manipulate selection sets in such embodiments. For example, after Mary goes on vacation, Bob may want to find the answer to "what were the selection sets that Mary created yesterday?" and then continue to operate the GUI, continuing where Mary left off. In essence, the capabilities built-in to the GUI to find (e.g. via search or filter), group (i.e. create named selection sets for later use), and manipulate can also be applied to the selection sets as well. This can be especially useful if the number of selection sets created by the users are also large.

The invention can implement these sets-of-selection sets in a variety of ways. For example, In the example GUI implementation that generated FIGS. 1-16, these sets of selection-sets were implemented in the same way as selection sets—i.e. it has a name (chosen by the user) and a list of entities. In this case, these entities can refer to either selection sets or other selectable entities. In other words, these set-of-sets can themselves be selection set for all intents and purposes. We can temporarily refer to these specifically as sets-of-selection-sets for clarification purposes, but in our GUI implementation of an embodiment, the software need not distinguish between the two.

In some embodiments, these sets-of-selection-sets can also carry around (e.g. be linked with) additional metadata similar to the metadata associated with the underlying objects (such as time of creation, and the user-ID of the creator). Additional types of user provided metadata may also be linked with the sets-of-selection-sets. Such additional metadata can also be searchable by the same search/filter interface in the GUI (i.e. Function 7). Boolean operations (i.e. functions 6), as well as filter composition (i.e. exemplar of function 8) can also be implemented so as to work on both kinds of selection sets.

There need not be a further hierarchy, such as sets of sets of selection sets, however. This is because in the present implementation, the selection-set abstraction methods can be implemented to also ontologically include sets-of-selection-sets. The GUI operations that create, search, manipulate (e.g. Boolean operations and compositions as well as arbitrary manipulation via user supplied programs), save (i.e. for later use), load (from a prior session) can be configured to all operate in the same manner for both types.

There are certain ease-of-use features that can distinguish between selection sets that only contain top level selectable entities versus ones that contain references to other selections sets in this exemplar GUI implementation, but they do not add additional capability other than saving the user some steps in certain situations.

It is also important to note that in some embodiments, function number 8 (i.e. the ability to invoke an arbitrary user supplied program) can also be configured to include the ability to reason about sets of selection sets. Thus, in a preferred embodiment of the invention, the system is configured so that the concept of sets of selection sets is ontologically and epistemologically included within Function 8.

Further GUI Discussion:

The invention may fully apply regardless of the kinds of selectable entities, the objects that the entities refer to, the actual GUI technology being used, the "look-and-feel" and the actual devices or methods or systems being used to select an entity within the GUI.

As previously discussed, a variety of different devices and methods may be used to convey user intentions to the system's GUI and computer processor. This includes touch devices, gesture recognition devices (either by visual or by some other means such as ultrasound or radar, voice recognition devices, and pointing devices (including joysticks, mouse, trackball), brain or neural scanning devices (where measured electrical impulses from a nerve or the measured activity of the user's brain are used to control the GUI) can also be potentially used as input devices for accepting commands from a user.

In some embodiments, GUI display may also comprise head mounted augmented reality or virtual reality displays. Additionally, holographic displays where three-dimensional images, text and other visual iconographies are rendered, either in stereoscopic format (e.g. where slightly varying images are rendered to each visual sensor (e.g. the human eye) to simulate the presence of a three-dimensional object are also contemplated. Such 3D displays may operate directly in open air (such as via interference of laser beams). Such 3D displays may also be implemented by other means such as a multitude of thin light emitting rods being raised/lowered/moved about in a darkened space quickly).

In a preferred embodiment, this invention and claims herein are intended for scenarios where a user interacts with a GUI.

Thus in a preferred embodiment, the GUI is configured to accept at least designating the selectable entities, the different entities, and selecting at least one set operation as input from a human user, and at least designating the selectable entities, the different entities, and selecting the at least one set operation is done by the human user using the GUI.

Further General Discussion.

In some embodiments, the invention can be a system for generating a graphical user interface (GUI), the system comprising: a processing device; and a memory device including instructions that are executable by the processing device for causing the processing device to create a set of selected entities as a selection set, and to save the selection set under a name to form a saved selection set, and then choosing a saved selection set to activate the entities previously saved in the selection set so chosen, for operation with the GUI.

In some embodiments, the memory device can further include instructions that are executable by the processing device for causing the processing device to add or remove additional entities from the saved selection set.

In some embodiments, the memory device can further include instructions that are executable by the processing device for causing the processing device to save the so modified selection set, either with the name of the original saved selection set or a new name.

In some embodiments, the memory device can further include instructions that are executable by the processing device for causing the processing device to perform set operations on one or more selection sets or saved selection sets (e.g. combine sets, subtract one set from an another, find common entities in multiple selection sets, etc. as per function 6) to create new selection sets which can then be saved, activated and modified (per previously discussed functions 1, 2, 3, 6), for operation with the GUI.

In some embodiments, the memory device can further include instructions that are executable by the processing device for causing the processing device to perform a search operation with the GUI, and the results of the search (or some subset of the results of the search as per function 7) then can be saved as a selection set, and modified at will, and then can be activated later (as per previously discussed functions 1, 2, 3, 7), for operation with the GUI.

In some embodiments, the memory device can further include instructions that are executable by the processing device for causing the processing device to perform arbitrary computation for the purposes of creating or modifying selection sets (as per function 8), which then can be saved as a selection set, and modified at will, then to activate the selection set later (as per previously discussed functions 1, 2, 3, 8), for operation with the GUI.

In some embodiments, the invention may be a non-transitory computer-readable medium comprising program code that is executable by a processing device for causing the processing device to create a set of selected entities as a selection set, and to save the selection set under a name to form a saved selection set, and then choosing a saved selection set to activate the entities previously saved in the selection set so chosen, for operation with the GUI.

In some embodiments, this non-transitory computer-readable medium can further comprise program code that is executable by the processing device for causing the processing device to add or remove additional entities from the saved selection set.

In some embodiments, the non-transitory computer-readable medium can further comprise program code that is executable by the processing device for causing the processing device to save the so modified selection set, either with the name of the original saved selection set or a new name.

In some embodiments, the non-transitory computer-readable medium can further comprise program code that is executable by the processing device for causing the processing device to perform set operations on one or more selection sets or saved selection sets (e.g. combine sets, subtract one set from an another, find common Entities in multiple Selection sets, etc. as per function 6) to create new selection sets which can then be saved, activated and modified (per previously discussed functions 1, 2, 3, 6), for operation with the GUI.

In some embodiments, the non-transitory computer-readable medium can further comprise program code that is executable by the processing device for causing the processing device to perform a search operation with the GUI, and the results of the search (or some subset of the results of the search as per function 7) then can be saved as a selection set, and modified at will, and then can be activated later (as per previously discussed functions 1, 2, 3, 7), for operation with the GUI.

In some embodiments, the non-transitory computer-readable medium of can further comprise program code that is executable by the processing device for causing the processing device to perform arbitrary computation for the purposes of creating or modifying selection sets (as per function 8), which then can be saved as a selection set, and modified at will, then to activate the selection set later (as per previously discussed functions 1, 2, 3, 8), for operation with the GUI.

In some embodiments, the invention may be a method for improving GUI usability. This method may comprise the steps of creating a set of selected entities as a selection set, and to save the selection set under a name to form a saved selection set, and then choosing a saved selection set to activate the entities previously saved in the selection set so chosen, for operation with the GUI.

In some embodiments, the method for improving GUI usability may further comprise adding or removing additional entities from the saved selection set.

In some embodiments, the method for improving GUI usability may further comprise saving the so modified selection set, either with the name of the original saved selection set or a new name.

In some embodiments, the method for improving GUI usability may further comprise performing set operations on one or more selection sets or saved selection sets (e.g. combine sets, subtract one set from an another, find common Entities in multiple Selection sets, etc. as per function 6) to create new selection sets which can then be saved, activated and modified (per previously discussed functions 1, 2, 3, 6)

In some embodiments, the method for improving GUI usability can further comprise performing a search operation with the GUI, and the results of the search (or some subset of the results of the search as per function 7) then can be saved as a selection set, and modified at will, and then can be activated later (as per previously discussed function 1, 2, 3, 7), for operation with the GUI.

In some embodiments, the method for improving GUI usability can further comprise performing arbitrary computation for the purposes of creating or modifying selection sets (as per function 8), which then can be saved as a selection set, and modified at will, then to activate the selection set later (as per previously discussed functions 1, 2, 3, 8), for operation with the GUI.

In some embodiments, the invention may be a system for generating a graphical user interface (GUI). This system may comprise: a processing device; and a memory device including instructions that are executable by the processing device for causing the processing device to perform the following steps and/or any combination or sequence of the steps—create a set of selected entities as a selection set; saving the selection set under a name to form a saved selection set; choosing a saved selection set to activate the entities previously saved in the selection set so chosen, for operation with the GUI; modify a selection set (named or not); perform set operations on one or more selection sets or saved selection sets to create new selection sets; tie search capability such that the search results (or a subset of the results) can be saved as a named selection set; perform arbitrary computation on selection sets (named or not) to create new selection sets; and removing unneeded selection sets.

In some embodiments, the invention may comprise a non-transitory computer-readable medium comprising program code that is executable by a processing device for causing the processing device to perform the following steps and/or any combination or sequence of the steps—create a set of selected entities as a selection set; saving the selection set under a name to form a saved selection set; choosing a saved selection set to activate the entities previously saved in the selection set so chosen, for operation with the GUI; modify a selection set (named or not); perform set operations on one or more selection sets or saved selection sets to create new selection sets; tie search capability such that the search results (or a subset of the results) can be saved as a named selection set; perform arbitrary computation on selection sets (named or not) to create new selection sets; and removing unneeded selection sets.

In some embodiments, the invention may comprise a method for improving a GUI usability comprising the following steps and/or any combination or sequence of the steps—creating a set of selected entities as a selection set; saving the selection set under a name to form a saved selection set; choosing a saved selection set to activate the entities previously saved in the selection set so chosen; modify a selection set (named or not); perform set operations on one or more selection sets or saved selection sets to create new selection sets; tie search capability such that the search results (or a subset of the results) can be saved as a named selection set; perform arbitrary computation on selection sets (named or not) to create new selection sets; and removing unneeded selection sets.

In another embodiment, the invention may be a graphical user interface (GUI) based method for managing selectable entities that comprises various combinations of the above functions, such as a) Designating, using a GUI and a computer processor, from a plurality of selectable entities, a selection set comprising entities from the plurality of selectable entities, and saving this selection set in computer memory as a first selection set. Here the entities can comprise any of files and directories;

b) Designating, using this GUI and a computer processor, from the plurality of selectable entities, at least one different selection set comprising different entities from this plurality of selectable entities, and saving each at least one different selection set in computer memory as at least one different selection set.

c) Selecting, using the GUI and the computer processor, at least one set operation to be performed on this first selection set and the at least one different selection set. Here the GUI can be configured to receive user input by any of a touch interface, pointing device, and gesture recognition device, and voice recognition device. Here at least some of the entities are displayed by the computer processor on the GUI, and are selected by the human user using any of the touch interface, pointing device and gesture recognition device, and voice recognition device to designate at least some of the entities that are displayed by the computer processor on the GUI. Note further that the at least one set operation may comprise any of set union, set intersection, and set inversion (i.e. set negation) operations.

d) Creating, using the computer processor, and the at least one set operation, and the first selection set, and the at least one different selection set, at least one new selection set.

e) Using (often automatically according to an operation designated by the user on the GUI) at least one new selection set to manage at least some of the selectable entities. Here, an example of such management is to use the at least one new selection set is used to perform (often automatically perform) any of memory storage operations and network transmission operations upon any of files and directories in this at least one new selection set.

The invention claimed is:

1. A graphical user interface (GUI) based method for managing selectable entities, said method comprising:
designating, using a GUI and a computer processor, from a plurality of selectable entities, irrespective of entity location or display status, a selection set comprising entities from said plurality of selectable entities, and optionally saving, in a recallable manner, said selection set computer memory as a first selection set;
designating, using said GUI and a computer processor, from said plurality of selectable entities, at least one different selection set comprising different entities, irrespective of entity location or display status, from said plurality of selectable entities, and optionally saving, in a recallable manner, each said at least one different selection set in computer memory as at least one different selection set;

selecting, using said GUI and a computer processor, at least one set operation to be performed on said first selection set and said at least one different selection set;

creating, using said computer processor, said at least one set operation, said first selection set, and said at least one different selection set, at least one new selection set;

and using said at least one new selection set to manage at least some of said selectable entities, irrespective of entity location or display status.

2. The method of claim 1, further comprising adding or removing additional entities from any of said first selection set, said at least one different selection set, or said at least one new selection set, thereby creating any of a modified first selection set, a modified different selection set, and a modified new selection set, irrespective of location or display status of the additional entities, said first selection set, at least one different selection set, or said at least one new selection set.

3. The method of claim 2, further comprising loading or saving or removing any of said modified first selection set, said modified different selection set, and said modified new selection set under any of their original names and their modified names, irrespective of location or display status of said modified first selection set, said modified different selection set, or said modified new selection set.

4. The method of claim 1, wherein said at least one set operation comprises any of set union, set intersection, and set inversion (i.e. set negation).

5. The method of claim 1, wherein said GUI and said computer processor are further configured to search said plurality of selectable entities, irrespective of location or display status, for at least one GUI selectable search parameter;

further using said GUI to define at least one GUI selectable parameter, and using said computer processor, said at least one GUI selectable parameter, and said plurality of selectable entities to determine any of said first selection set and said at least one different selection set, irrespective of location or display status.

6. The method of claim 1, further using said GUI and said computer processor to create or select at least one script or program, irrespective of location or display status of script or program, thereby determining at least one selected script or program;

said at least one script or program configured to accept said at least one new selection set as any of input or output parameters for said at least one script or program;

and using said computer processor to execute said script according to said at least one new selection set.

7. The method of claim 1, wherein said entities comprise any of files and directories; and wherein said at least one new selection set is used to perform any of memory storage operations and network transmission operations upon any of files and directories in said at least one new selection set.

8. The method of claim 1, wherein said entities comprise any of remotely hosted audio and video streams, said GUI and said computer processor are further configured with web browser functionality, and said first selection set, said at least one different selection set, and said at least one new selection set comprise sets comprising any of said remotely hosted audio and video streams.

9. The method of claim 1, wherein said entities comprise items in a video game, said video game configured to be run by one selected from the group including a computer processor, a computer processor and at least one remote server, and at least one remote server, and said first selection set, said at least one different selection set, and said at least one new selection set comprise sets comprising any of said items in a video game.

10. The method of claim 1, wherein said GUI is configured to receive user input by any of a touch interface, pointing device, and gesture recognition device, and voice recognition device, and wherein at least some of said entities are displayed by said computer processor on said GUI, and are selected using any of said touch interface and pointing device and gesture recognition device, and voice recognition device to designate at least some of said entities displayed by said computer processor on said GUI.

11. The method of claim 1, wherein said entities comprise of any object, manipulatable by the GUI, that can be selected by any methodology available in said GUI; or wherein any selection set further comprises a set of selection sets.

12. The method of claim 1, wherein said GUI is configured to accept at least designating said selectable entities, said different entities, and selecting said at least one set operation as input from a user, and at least designating said selectable entities, said different entities, and selecting said at least one set operation is done by said user using said GUI.

13. A graphical user interface (GUI) based method for managing selectable entities, said method comprising:

designating, using a GUI and a computer processor, from a plurality of selectable entities, irrespective of entities location or display status, a selection set comprising entities from said plurality of selectable entities, and optionally saving, in a recallable manner, said selection set in computer memory as a first selection set;

wherein said entities comprise any of files and directories;

designating, using said GUI and a computer processor, from said plurality of selectable entities, at least one different selection set comprising different entities from said plurality of selectable entities, and saving each said at least one different selection set in computer memory as at least one different selection set;

selecting, using said GUI and a computer processor, at least one set operation to be performed on said first selection set and said at least one different selection set;

wherein said GUI is configured to receive user input by any of a touch interface, pointing device, and gesture recognition device, and voice recognition device, and wherein at least some of said entities are displayed by said computer processor on said GUI, and are selected using any of said touch interface, pointing device and gesture recognition device, and voice recognition device to designate at least some of said entities displayed by said computer processor on said GUI;

wherein said at least one set operation comprises any of set union, set intersection, and set inversion (i.e. set negation);

creating, using said computer processor, said at least one set operation, said first selection set, and said at least one different selection set, at least one new selection set;

and using said at least one new selection set to manage at least some of said selectable entities;

wherein said at least one new selection set is used to perform any of memory storage operations and network transmission operations upon any of files and directories in said at least one new selection set; and wherein location or display status of said first selection set, one different selection set, and one new selection is irrelevant.

14. The method of claim 13, further comprising adding or removing additional entities from any of said first selection set, said at least one different selection set, or said at least one new selection set, thereby creating any of a modified first selection set, a modified different selection set, and a modified new selection set; or wherein any selection set further comprises a set of selection sets.

15. The method of claim 14, further comprising loading, saving, or removing any of said modified first selection set, said modified different selection set, and said modified new selection set under any of their original names and their modified names.

16. The method of claim 13, wherein said GUI and said computer processor are further configured to search said plurality of selectable entities for at least one GUI selectable search parameter;

further using said GUI to define at least one GUI selectable parameter, and using said computer processor, said at least one GUI selectable parameter, and said plurality of selectable entities to determine any of said first selection set and said at least one different selection set.

17. The method of claim 13, further using said GUI and said computer processor to create or select at least one script or program, irrespective of the location or display status of the script or program, thereby determining at least one selected script or program;

said at least one selected script or program configured to accept said at least one new selection set as any of input or output parameters for said at least one script or program;

and using said computer processor to execute said script according to said at least one new selection set.

18. The method of claim 13, wherein said entities comprise any of remotely hosted audio and video streams, said GUI and said computer processor are further configured with web browser functionality, and said first selection set, said at least one different selection set, and said at least one new selection set comprise sets comprising any of said remotely hosted audio and video streams.

19. The method of claim 13, wherein said entities comprise items in a video game, said video game configured to be run one selected from the group including a computer processor, a computer processor and at least one remote server, and at least one remote server, said at least one different selection set, and said at least one new selection set comprise sets comprising any of said items in a video game.

20. The method of claim 13, wherein said GUI is configured to accept at least designating said selectable entities, said different entities, and selecting said at least one set operation as input from a user, and at least designating said selectable entities, said different entities, and selecting said at least one set operation is done by said user using said GUI.

* * * * *